(12) United States Patent
Strater et al.

(10) Patent No.: US 12,082,045 B2
(45) Date of Patent: *Sep. 3, 2024

(54) METHOD AND APPARATUS FOR OPTIMIZED OFDMA SUBCARRIER ALLOCATION

(71) Applicant: ARRIS Enterprises LLC, Suwanee, GA (US)

(72) Inventors: Jay William Strater, San Diego, CA (US); Gregory Nobutaka Nakanishi, San Diego, CA (US); Kwoktung Brian Lo, Palo Alto, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,464

(22) Filed: Jan. 9, 2023

(65) Prior Publication Data

US 2023/0164627 A1 May 25, 2023

Related U.S. Application Data

(63) Continuation of application No. 17/331,952, filed on May 27, 2021, now Pat. No. 11,582,643.
(Continued)

(51) Int. Cl.
*H04W 28/086* (2023.01)
*H04L 1/00* (2006.01)
(Continued)

(52) U.S. Cl.
CPC ....... *H04W 28/0862* (2023.05); *H04L 1/0003* (2013.01); *H04L 5/0007* (2013.01);
(Continued)

(58) Field of Classification Search
None
See application file for complete search history.

(56) References Cited

U.S. PATENT DOCUMENTS 10,560,379 B1  2/2020  Ghosh
2007/0268860 A1  11/2007  Taneja
(Continued)

FOREIGN PATENT DOCUMENTS

EP  1 760 954  5/2008
EP  3 484 105  5/2019
(Continued)

OTHER PUBLICATIONS

International Preliminary Report on Patentability dated Feb. 7, 2023 in International (PCT) Application No. PCT/US2021/034428.
(Continued)

*Primary Examiner* — Kenny S Lin
(74) *Attorney, Agent, or Firm* — Wenderoth, Lind & Ponack, L.L.P.

(57) ABSTRACT

A method of OFDMA subcarrier allocation for stations in a wireless network includes determining a total downlink buffered traffic load for downlink traffic from a gateway device to the stations, and receiving a total uplink buffered traffic load for uplink traffic from the stations to the gateway device. The method further includes determining a first ratio of total downlink buffered traffic load for each station in relation to total downlink buffered traffic load for all stations, determining a second ratio of total uplink buffered traffic load for each station in relation to total uplink buffered traffic load for all stations, performing OFDMA subcarrier allocation for the downlink traffic by assigning available channel bandwidth proportional to the first ratio for each station, and performing OFDMA subcarrier allocation for
(Continued)

the uplink traffic by assigning available channel bandwidth proportional to the second ratio for each station.

20 Claims, 8 Drawing Sheets

Related U.S. Application Data

(60) Provisional application No. 63/062,003, filed on Aug. 6, 2020.

(51) Int. Cl.
*H04L 5/00* (2006.01)
*H04W 28/02* (2009.01)
*H04W 88/14* (2009.01)
*H04W 88/16* (2009.01)
*H04W 84/12* (2009.01)

(52) U.S. Cl.
CPC ....... *H04W 28/0278* (2013.01); *H04W 88/14* (2013.01); *H04W 88/16* (2013.01); *H04W 84/12* (2013.01)

(56) References Cited

U.S. PATENT DOCUMENTS

| | | | |
|---|---|---|---|
| 2013/0039193 A1* | 2/2013 | Yin | H04W 72/52 370/252 |
| 2013/0083736 A1* | 4/2013 | Yin | H04W 72/0446 370/329 |
| 2013/0194980 A1 | 8/2013 | Yin | |
| 2018/0041440 A1 | 2/2018 | Goemaere | |
| 2019/0357143 A1* | 11/2019 | Wang | H04W 52/0229 |

FOREIGN PATENT DOCUMENTS

| | | |
|---|---|---|
| WO | 2010/103048 | 9/2010 |
| WO | 2015/131920 | 9/2015 |

OTHER PUBLICATIONS

International Search Report and the Written Opinion of the International Searching Authority dated Sep. 20, 2021 in International (PCT) Application No. PCT/US2021/034428.

* cited by examiner

METHOD AND APPARATUS FOR OPTIMIZED OFDMA SUBCARRIER ALLOCATION

BACKGROUND

In order to address exhaustion of the available spectrum capacity in the 5 GHz band, unlicensed use of the 6 GHz band (5.925 GHz-7.125 GHz) for Wi-Fi has been approved by the FCC in April 2020. Opening up a contiguous 1200 MHz chunk of spectrum above the 5 GHz band will enable a substantial amount of new bandwidth over multiple wideband channels. Introduction of the 6 GHz band for Wi-Fi use will provide enough spectrum to safely deploy 80 MHz and 160 MHz wide channels, with high throughput rates (higher data speeds, lower latency) and congestion-free network access with less interference from legacy devices. The 6 GHz band will accommodate up to 14 additional 80 MHz channels and 7 additional 160 MHz channels.

Residential Wi-Fi networks are now being built with Access Points (APs) that support IEEE 802.11ax (Wi-Fi 6) high efficiency standard. This wireless communications protocol applies to residential gateways (RGs) and wireless extenders that provide Internet access and other services to client stations in a local area network (LAN). 802.11ax introduces Orthogonal Frequency Division Multiple Access (OFDMA), which allows multiple clients to concurrently share transmit/receive opportunities via individual subcarrier allocation of a given channel bandwidth. This promises to provide considerable benefit to Wi-Fi network throughput, particularly relative to the inefficiencies of having each client compete for transmit opportunities via Carrier Sense Multiple Access (CSMA).

Wireless devices that are capable of 6 GHz operation (Wi-Fi over 6 GHz radios) are referred to as Wi-Fi 6E devices, and will provide the benefits of the IEEE 802.11ax (Wi-Fi 6) standard (higher performance in terms of faster data rates and lower latency) in the 6 GHz band. Wi-Fi 6E devices can make use of the wider channels and additional capacity to provide better performance and support denser deployments. Thus, Wi-Fi 6E devices will be able to provide clean uncongested bandwidth and enable multi-gigabit data speeds. The 6 GHz Wi-Fi technology allows new high bandwidth, low latency, and high quality-of-service (QoS) services to be built on it. Developing technology for Wi-Fi in the 6 GHz band will be essential for residential multi-access point and mesh network, multiple dwelling unit (MDU) single-access point networks, high-density enterprise networks, indoor public venues, industrial Internet of Things (IoT), etc.

The choice of OFDMA subcarrier allocation to clients is not specified by the IEEE 802.11ax standard, but rather is left to vendors to determine how they will implement the allocation of channel bandwidth. This has led device manufacturers to consider what varying levels of flexibility may be needed for OFDMA subcarrier allocation in gateways, APs, extenders, and the like.

In a residential gateway, AP, extender, etc., 6 GHz radios could be used as both a Wide Area Network (WAN) interface and a local area network (LAN) interface. Typically, the physical WAN interface is a different technology from the physical LAN interface. Common WAN interfaces include DOCSIS over coax, xDSL, fiber, and LTE, for example. These are interfaces to the service provider network that user equipment (e.g., phones, laptops, set-top boxes, etc.) do not usually have. Common LAN interfaces include Ethernet and Wi-Fi, with one or both interfaces being commonly supported in the user equipment. Thus, physically separate interfaces between the WAN and the LAN are required in the existing related technology (with the exception of Ethernet, which is common as both a WAN and LAN technology). An Ethernet WAN is often used when the router is connected to another access device, such as a DSL modem, cable modem, or ONT, for example.

Until recently, the LAN interface speeds have not been fast enough to handle both WAN traffic and LAN traffic simultaneously. With the anticipated availability of the 6 GHz spectrum for Wi-Fi and the higher speeds supported by IEEE 802.11ax (Wi-Fi 6E), as well as 10G Ethernet now starting to be considered as a LAN interface, these interfaces are becoming fast enough to support both LAN traffic and WAN traffic at the same time. A main attraction of the 6 GHz spectrum is that it is new clean spectrum without very much interference to reduce throughput (at least not until widely implemented after some time), and there is a lot of bandwidth available as compared to the 5 GHz and 2.4 GHz spectrums. However, implementing an RG, AP, or wireless extender with a first 6 GHz Wi-Fi radio for the WAN interface and a second 6 GHz Wi-Fi radio for the LAN interface is expensive. Accordingly, it would be desirable to develop a solution in which a single 6 GHz Wi-Fi radio can be used as both the WAN interface and the LAN interface.

SUMMARY

Aspects of the present disclosure provide novel solutions for enabling a network gateway device to implement a flexible OFDMA subcarrier allocation solution. The gateway device may also be referred to generally as a Wi-Fi access point or AP herein, and the solutions may apply similarly to wireless extenders and other wireless networking devices of this type. The gateway device includes a single physical Wi-Fi radio configured with two separate virtual interfaces (or logical interfaces) for WAN traffic and LAN traffic, respectively. The single Wi-Fi AP and 6 GHz radio is configured to serve both Local Area Network (LAN) and Wide Area Network (WAN) 6 GHz backhaul needs. In addition, the gateway device provides support for routing functionality (e.g., firewall, network address translation (NAT), etc.) to be applied between WAN and LAN traffic associated with the 6 GHz AP.

An aspect of the present disclosure provides gateway device capable of orthogonal frequency division multiple access (OFDMA) subcarrier allocation for stations in a wireless network. The gateway device includes a memory storing instructions, and a processor configured to execute the one or more programs to establish wireless backhaul connections with a wide area network backhaul station (WAN BSTA) and one or more local area network backhaul stations (LAN BSTAs), among the stations in the wireless network. The processor may be configured to determine a total downlink buffered traffic load for downlink traffic from the gateway device to each of the WAN BSTA and the one or more LAN BSTAs, respectively, and receive, from the WAN BSTA and the one or more LAN BSTAs, a total uplink buffered traffic load for uplink traffic from each of the WAN BSTA and the one or more LAN BSTAs, respectively, to the gateway device. The processor may also be configured to determine a first ratio of the total downlink buffered traffic load for each of the WAN BSTA and the one or more LAN BSTAs, respectively, in relation to a total downlink buffered traffic load for all of the stations in the wireless network, and determine a second ratio of the total uplink buffered traffic load for each of the WAN BSTA and the one or more LAN BSTAs, respectively, in relation to a total uplink buffered traffic load for all of the stations in the wireless network. The processor may also be configured to perform OFDMA subcarrier allocation for the downlink traffic by assigning available channel bandwidth proportional to the first ratio for each of the WAN BSTA and the one or more LAN BSTAs, respectively, and perform OFDMA subcarrier allocation for the uplink traffic by assigning available channel bandwidth proportional to the second ratio for each of the WAN BSTA and the one or more LAN BSTAs, respectively.

In an aspect of the present disclosure, the processor may be further configured to determine an access category (AC) of a highest priority downlink traffic remaining at the gateway device for transmission to each of the WAN BSTA and the one or more LAN BSTAs, respectively, and receive, from the WAN BSTA and the one or more LAN BSTAs, an access category (AC) of a highest priority uplink traffic remaining at each of the WAN BSTA and the one or more LAN BSTAs, respectively, for transmission to the gateway device, and an uplink buffered traffic load for the highest priority uplink traffic. The processor may be further configured to determine a downlink AC scale factor corresponding to the AC of the highest priority downlink traffic for each of the WAN BSTA and the one or more LAN BSTAs, respectively, and determine an uplink AC scale factor corresponding to the AC of the highest priority uplink traffic for each of the WAN BSTA and the one or more LAN BSTAs, respectively. The processor may be further configured to determine a third ratio of the total downlink buffered traffic load for each of the WAN BSTA and the one or more LAN BSTAs multiplied by the downlink AC scale factor for the highest priority downlink traffic for each of the WAN BSTA and the one or more LAN BSTAs, respectively, in relation to an aggregate of prior downlink buffered traffic load values for all of the stations in the wireless network, and determine a fourth ratio of the total uplink buffered traffic load for each of the WAN BSTA and the one or more LAN BSTAs, plus the uplink buffered traffic load for the highest priority uplink traffic multiplied by the uplink AC scale factor of each of the WAN BSTA and the one or more LAN BSTAs, respectively, in relation to an aggregate of prior uplink buffered traffic load values for all of the stations in the wireless network. The processor may be further configured to perform the OFDMA subcarrier allocation for the downlink traffic by assigning available channel bandwidth proportional to the third ratio for each of the WAN BSTA and the one or more LAN BSTAs, respectively, and perform the OFDMA subcarrier allocation for the uplink traffic by assigning available channel bandwidth proportional to the fourth ratio for each of the WAN BSTA and the one or more LAN BSTAs, respectively.

In an aspect of the present disclosure, the processor may be further configured to establish a wireless fronthaul connection with one or more LAN side client stations (LAN client STAs), among the stations in the wireless network. The processor may be further configured to determine a total downlink buffered traffic load for downlink traffic from the gateway device to each of the one or more LAN client STAs, respectively, and receive, from the one or more LAN client STAs, a total uplink buffered traffic load for uplink traffic from each of the one or more LAN client STAs, respectively, to the gateway device. The processor may be further configured to determine a modulation and coding scheme (MCS) scale factor for each of the one or more LAN client STAs, the MCS scale factor being a ratio of MCS that is required by each of the one or more LAN client STAs in relation to a base MCS representing a min-range link quality, respectively. The processor may be further configured to determine a fifth ratio of the total downlink buffered traffic load for the WAN BSTA, plus the total downlink buffered traffic load of the one or more LAN BSTAs, plus the total downlink buffered traffic load of the one or more LAN client STAs multiplied by the MCS scaling factor of each of the one or more LAN client STAs, respectively, in relation to an aggregate of prior downlink buffered traffic load values for all of the stations in the wireless network, and determine a sixth ratio of the total uplink buffered traffic load for the WAN BSTA, the total uplink buffered traffic load for the one or more LAN BSTAs, and the total uplink buffered traffic load for the one or more LAN client STAs multiplied by the MCS scaling factor of each of the one or more LAN client STAs, respectively, in relation to an aggregate of prior uplink buffered traffic load values for all of the stations in the wireless network. The processor may be further configured to perform the OFDMA subcarrier allocation for the downlink traffic by assigning available channel bandwidth proportional to the fifth ratio for each of the WAN BSTA, the one or more LAN BSTAs, and the one or more LAN client STAs, respectively, and perform the OFDMA subcarrier allocation for the uplink traffic by assigning available channel bandwidth proportional to the sixth ratio for each of the WAN BSTA, the one or more LAN BSTAs, and the one or more LAN client STAs, respectively.

In an aspect of the present disclosure, the processor may be further configured to determine an access category (AC) of a highest priority downlink traffic remaining at the gateway device for transmission to each of the WAN BSTA and the one or more LAN BSTAs, respectively, and receive, from the WAN BSTA and the one or more LAN BSTAs, an access category (AC) of a highest priority uplink traffic remaining at each of the WAN BSTA and the one or more LAN BSTAs, respectively, for transmission to the gateway device, and an uplink buffered traffic load for the highest priority uplink traffic. The processor may be further configured to establish a wireless fronthaul connection with one or more LAN side client stations (LAN client STAs), among the stations in the wireless network. The processor may be further configured to determine a total downlink buffered traffic load for downlink traffic from the gateway device to each of the one or more LAN client STAs, respectively, and an AC of a highest priority downlink traffic remaining at the gateway device for transmission to each of the LAN client STAs, respectively, and receive, from the one or more LAN client STAs, a total uplink buffered traffic load for uplink traffic from each of the one or more LAN client STAs, respectively, to the gateway device, and an AC of a highest priority uplink traffic remaining at each of the one or more LAN client STAs, respectively, for transmission to the gateway device, and an uplink buffered traffic load for the highest priority uplink traffic. The processor may be further configured to determine a downlink AC scale factor corresponding to the AC of the highest priority downlink traffic for each of the WAN BSTA, the one or more LAN BSTAs, and the one or more LAN client STAs, respectively, and determine an uplink AC scale factor corresponding to the AC of the highest priority uplink traffic for each of the WAN BSTA, the one or more LAN BSTAs, and the one or more LAN client STAs, respectively. The processor may be further configured to determine a modulation and coding scheme (MCS) scale factor for each of the one or more LAN client STAs, the MCS scale factor being a ratio of MCS that is required by each of the one or more LAN client STAs in relation to a base MCS representing a min-range link quality, respectively. The processor may be further configured to perform the OFDMA subcarrier allocation for the downlink traffic based on the total downlink buffered traffic load and the downlink AC scale factor for each of the WAN BSTA, the one or more LAN BSTAs, and the one or more LAN client STAs, respectively, and further based on the MCS scale factor for each of the one or more LAN client STAs, and perform the OFDMA subcarrier allocation for the uplink traffic based on the total uplink buffered traffic load and the uplink AC scale factor for each of the WAN BSTA, the one or more LAN BSTAs, and the one or more LAN client STAs, respectively, and further based on the MCS scale factor for each of the one or more LAN client STAs.

In an aspect of the present disclosure, the processor may be configured to perform the OFDMA subcarrier allocation for the downlink traffic and the uplink traffic by referring to a table stored in the memory of the gateway device, wherein the table indicates a maximum number of resource units (RUs) for each channel width, selecting a closest set of RUs from the table for the downlink traffic based on the first ratio of the total downlink buffered traffic load for each of the stations, respectively, and selecting a closest set of RUs from the table for the uplink traffic based on the second ratio of the total uplink buffered traffic load for each of the stations, respectively.

In an aspect of the present disclosure, the processor may be further configured to periodically or dynamically determine an updated buffer status for the downlink traffic for the stations, and periodically or dynamically receive, from the stations, an updated buffer status for the uplink traffic for the gateway device. The processor may be further configured to determine an updated ratio of the total downlink buffered traffic load for each of the stations, determine an updated ratio of the total uplink buffered traffic load for each of the stations, perform OFDMA subcarrier allocation for the downlink traffic by reallocating RUs of the available channel bandwidth based on the updated ratio of the total downlink buffered traffic load for each of the stations, and perform OFDMA subcarrier allocation for the uplink traffic by reallocating RUs of the available channel bandwidth based on the updated ratio of the total uplink buffered traffic load for each of the stations.

An aspect of the present disclosure provides a method of orthogonal frequency multiple access (OFDMA) subcarrier allocation for stations in a wireless network. The method may include establishing, by a gateway device, wireless backhaul connections with a wide area network backhaul station (WAN BSTA) and one or more local area network backhaul stations (LAN BSTAs), among the stations in the wireless network. The method may also include determining a total downlink buffered traffic load for downlink traffic from the gateway device to each of the WAN BSTA and the one or more LAN BSTAs, respectively, and receiving, from the WAN BSTA and the one or more LAN BSTAs, a total uplink buffered traffic load for uplink traffic from each of the WAN BSTA and the one or more LAN BSTAs, respectively, to the gateway device. The method may also include determining a first ratio of the total downlink buffered traffic load for each of the WAN BSTA and the one or more LAN BSTAs, respectively, in relation to a total downlink buffered traffic load for all of the stations in the wireless network, and determining a second ratio of the total uplink buffered traffic load for each of the WAN BSTA and the one or more LAN BSTAs, respectively, in relation to a total uplink buffered traffic load for all of the stations in the wireless network. The method may also include performing OFDMA subcarrier allocation for the downlink traffic by assigning available channel bandwidth proportional to the first ratio for each of the WAN BSTA and the one or more LAN BSTAs, respectively, and performing OFDMA subcarrier allocation for the uplink traffic by assigning available channel bandwidth proportional to the second ratio for each of the WAN BSTA and the one or more LAN BSTAs, respectively.

An aspect of the present disclosure provides one or more non-transitory computer-readable media storing instructions for orthogonal frequency division multiple access (OFDMA) subcarrier allocation for stations in a wireless network. The instructions when executed by a processor of the gateway device described above cause the gateway device to perform operations including the steps of the method described above.

The above-described method and computer-readable medium may be implemented in a residential gateway (RG) or other home network gateway device according to some example embodiments. However, some other example embodiments are not limited thereto, and the method and computer-readable medium may be implemented by a wireless extender, or a Wi-Fi access point (AP), or other similar electronic devices that enable wireless networking.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
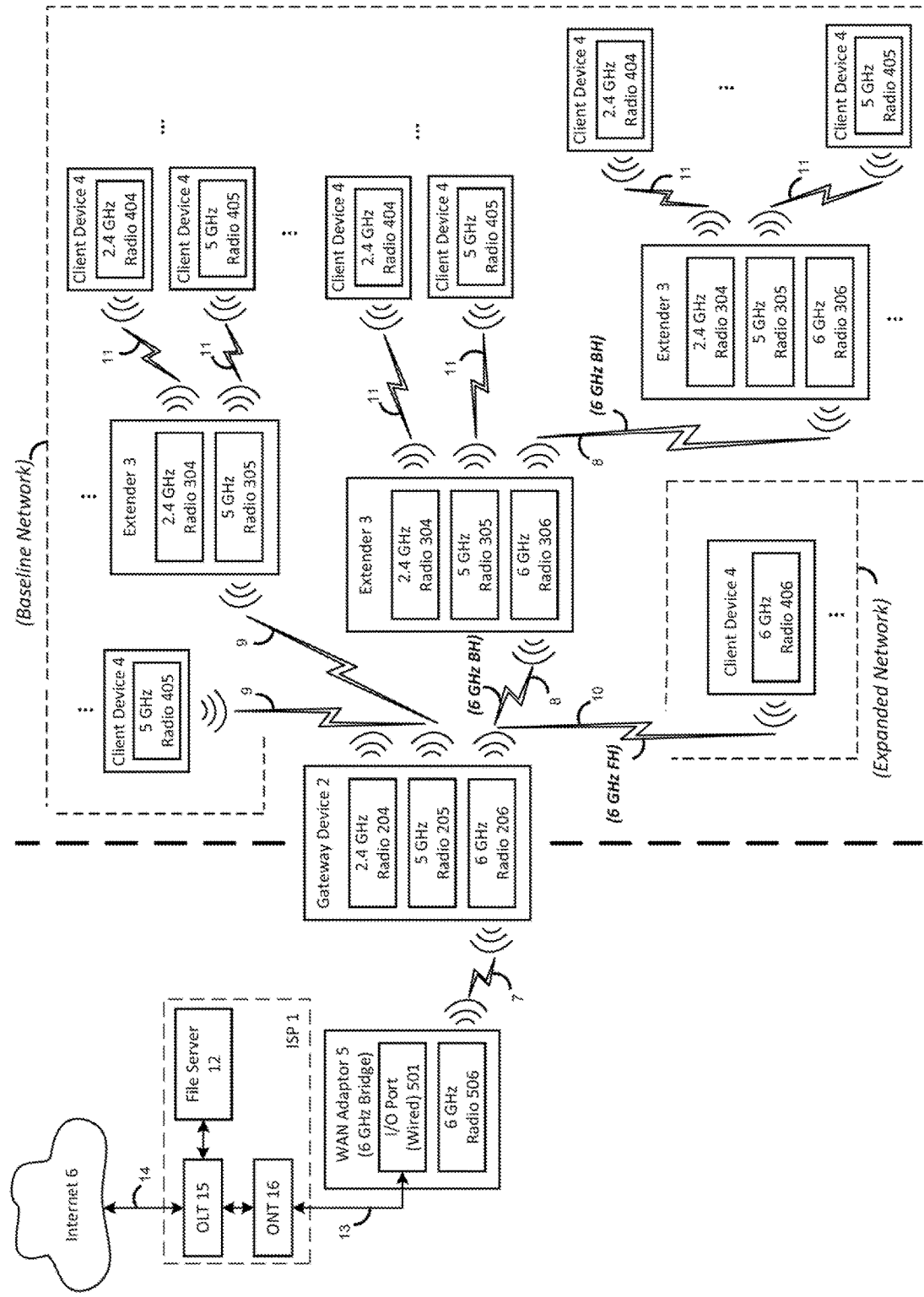
FIG. 1 is a schematic diagram of a system, according to an embodiment of the present disclosure.

FIG. 1 is a schematic diagram of a system, according to an embodiment of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system include a gateway device 2 connected to the Internet 6 via an Internet Service Provider (ISP) 1 and a wide area network (WAN) adaptor 5, and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The ISP 1 may have various hardware components associated therewith, including but not limited to a file server 12, an optical line terminal (OLT) 15, and an optical network terminal (ONT) 16.

The connection 14 between the Internet 6 and the ISP 1 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The wide area network (WAN) adaptor 5 can be a hardware electronic device that provides an interface between the Internet 6 via the ISP 1, and the gateway device 2. The WAN adaptor 5 may include various components, including but not limited to an input/output (I/O) port 501 (wired connection interface) such as an Ethernet port, or cable port, a fiber optic port, or the like, and a 6 GHz radio 506 (wireless connection interface). The WAN adaptor 5 "adapts" the 6 GHz interface to an interface supported by the ISP-provided WAN access device (e.g., a connection 13, such as Ethernet, to the ONT 16). Thus, the WAN adaptor 5 serves as a "6 GHz to Ethernet Bridge" connecting the gateway device 2 to the Internet 6, according to example embodiments of the present disclosure. Other types of WAN access devices include a DOCSIS modem, a DSL modem, and a fixed wireless modem. In some example embodiments, the WAN adaptor 5 may be a separate device that sits in between an ISP-provided modem, modem/router combination or the like, and the gateway device 2.

The connection 13 between the ISP 1 (e.g., via the ONT 16) and the WAN adaptor 5 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 between the WAN adaptor 5 and the ISP 1 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and network gateway device that combines the functions of a modem, an access point (AP), and/or a router for providing content received from the ISP 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The gateway device 2 may also be referred to as a residential gateway (RG), a broadband access gateway, a home network gateway, a home router, or a wireless access point (AP).

The gateway device 2 can include one or more wired interfaces (e.g., an Ethernet port, a cable port, a fiber optic port, or the like) and multiple wireless interfaces, including but not limited to a 2.4 GHz radio 204, a 5 GHz radio 205, and a 6 GHz radio 206.

The connection 7 between the gateway device 2 and the WAN adaptor 5 and the connection 8 between the gateway device 2 and the wireless extenders 3 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connection 7 and/or the connection 8 can also be a wired Ethernet connection.

The connection 7 between the gateway device 2 and the WAN adaptor 5 may be implemented via the 6 GHz radio 206 of the gateway device 2 and the 6 GHz radio 506 of the WAN adaptor 5, for example. The connection 7 enables the gateway device 2 and the WAN adaptor 5 to establish a dedicated 6 GHz wireless backhaul (6 GHz BH) according to example embodiments of the present disclosure. However, the connection 7 could also be implemented using respective wired interfaces (e.g., Ethernet, cable, fiber optic, or the like) in some alternative example embodiments.

The connection 8 between the gateway device 2 and the wireless extenders 3 can be implemented using the 6 GHz radio 206 of the gateway device 2 and the 6 GHz radios 306 of the wireless extenders 3, for example. The connection 8 enables the gateway device 2 and the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points (APs) used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 8 between respective wireless extenders 3 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. The connection 8 can also be a wired Ethernet connection.

The connection 8 between respective wireless extenders 3 can be implemented using the 6 GHz radio 306 of the wireless extenders 3, for example. The connection 8 enables the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a television (TV), an IP/QAM set-top box (STB) or a streaming media decoder (SMD) that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

The connection 10 between the client device 4 and the gateway device 2 can be implemented using the 6 GHz radio 406 of the client device 4 and the 6 GHz radio 206 of the gateway device 2, for example. The connection 10 enables the gateway device 2 and the client device 4 to establish a 6 GHz wireless fronthaul (6 GHz FH) according to example embodiments of the present disclosure. However, the connection 10 could also be implemented using respective wired interfaces (e.g., Ethernet, cable, fiber optic, or the like) in some alternative example embodiments.

The connection 11 between the wireless extenders 3 and the client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The connection 11 between the wireless extenders 3 and the client devices 4 can be implemented using the 2.4 GHz radio 404 or the 5 GHz radio 405 of the client devices 4 and the 2.4 GHz radio 304 or the 5 GHz radio 305 of the wireless extenders 3, for example. The connection 11 enables the wireless extenders 3 and the client devices 4 to establish a 2.4 GHz wireless fronthaul or a 5 GHz wireless fronthaul, according to example embodiments of the present disclosure. However, the connection 11 could also be implemented using respective wired interfaces (e.g., Ethernet, cable, fiber optic, or the like) in some alternative example embodiments.

Figure 2:
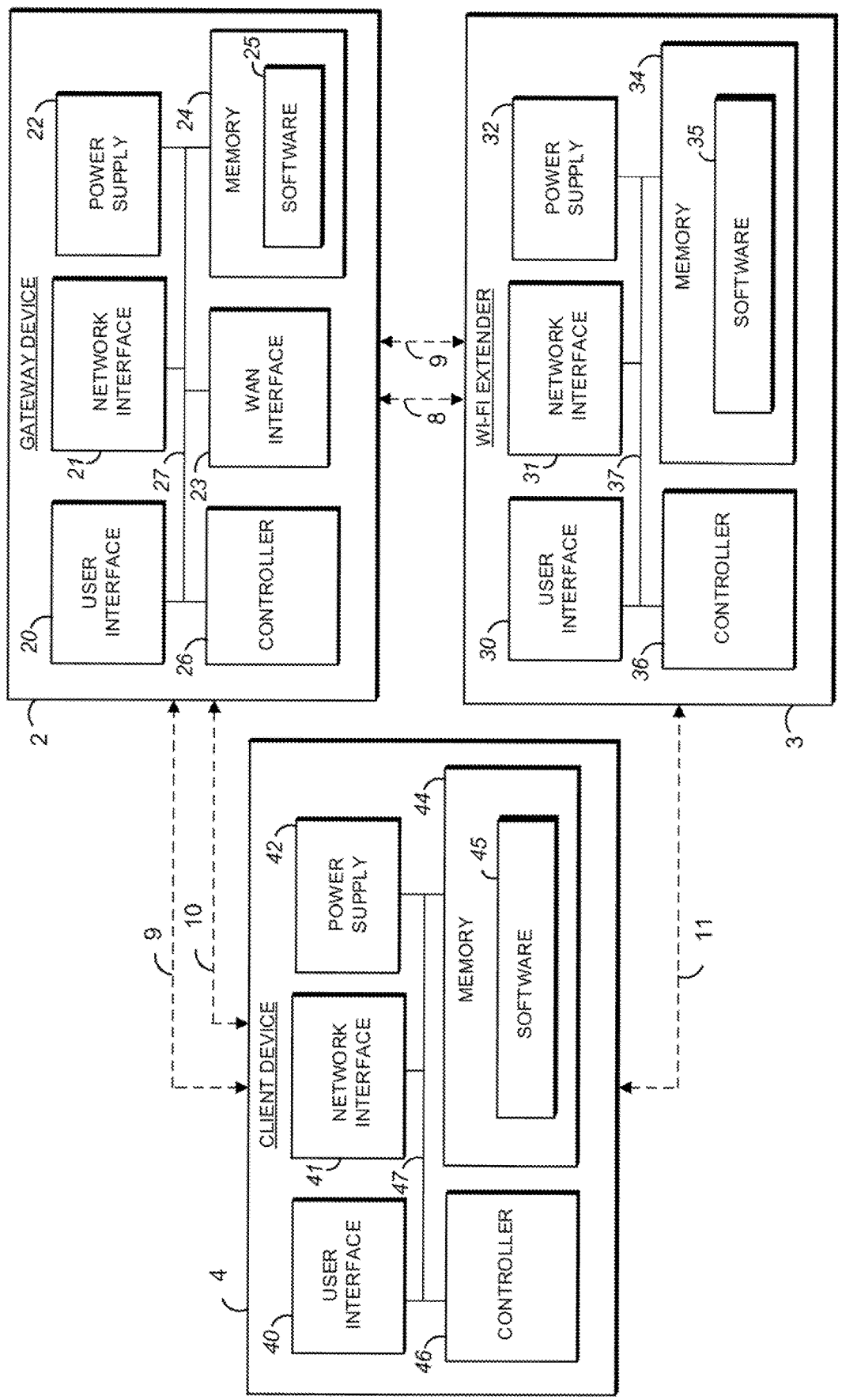
FIG. 2 is a more detailed block diagram illustrating various components of an exemplary gateway device, client device, and wireless extender implemented in the system of FIG. 1 according to an embodiment of the present disclosure.
Figure 3:
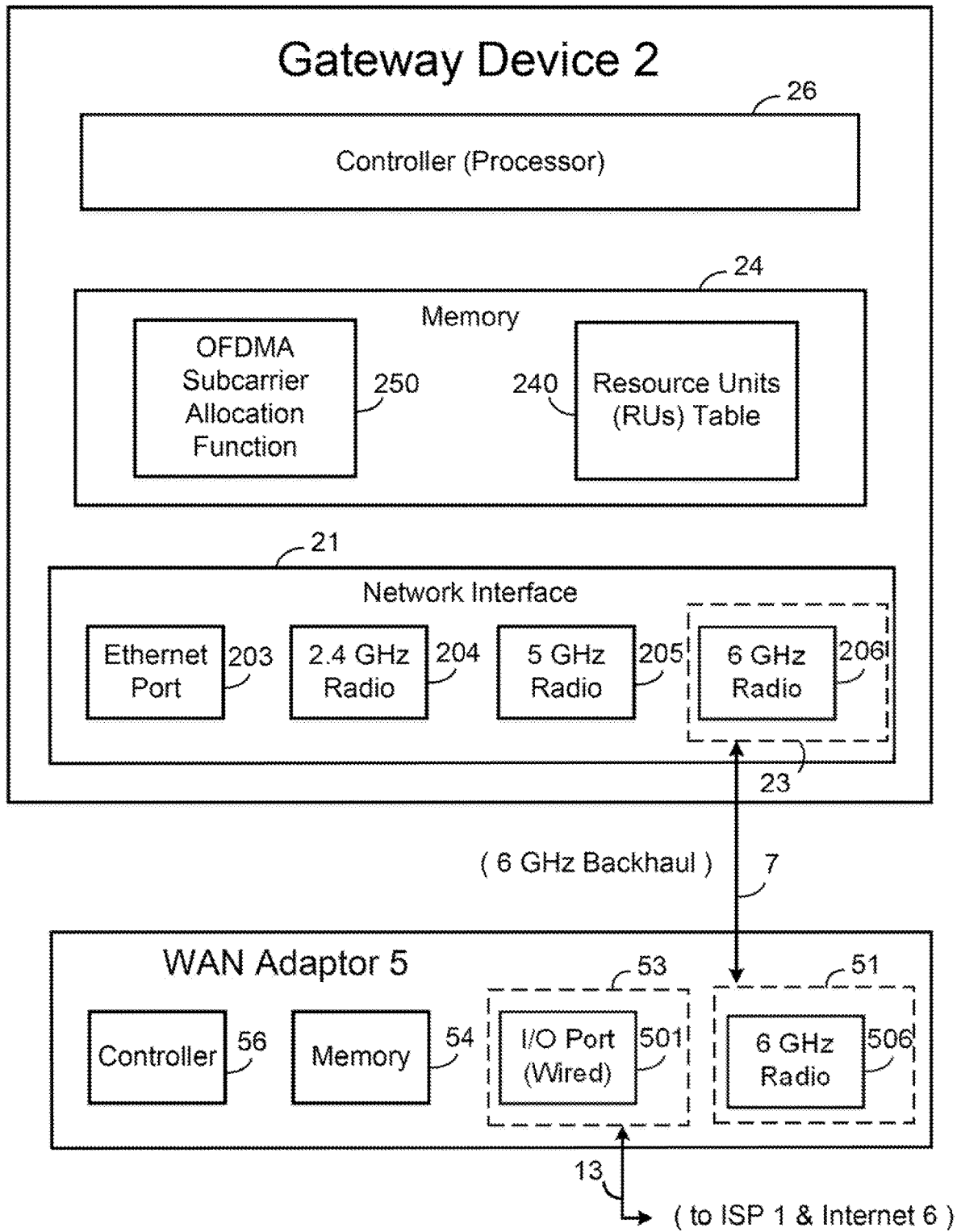
FIG. 3 is a more detailed block diagram illustrating certain components of an exemplary gateway device and an exemplary wide area network adaptor implemented in the system of FIG. 1 according to an embodiment of the present disclosure.

A more detailed description of the exemplary internal components of the gateway device 2, the wireless extenders 3, the client devices 4, and the WAN adaptor 5 shown in FIG. 1 will be provided in the discussion of FIGS. 2 and 3. However, in general, it is contemplated by the present disclosure that the gateway device 2, the wireless extenders 3, the client devices 4, and the WAN adaptor 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the gateway device 2, the wireless extenders 3, the client devices 4, and the WAN adaptor 5 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, the client devices 4, and the WAN adaptor 5 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of an exemplary gateway device, client device, and wireless extender implemented in the system of FIG. 1, according to an embodiment of the present disclosure.

Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 8, 9, 10, and 11 between the gateway device 2, the wireless extender 3, and the client device 4 shown in FIG. 2 are meant to be exemplary connections and are not meant to indicate all possible connections between the gateway devices 2, wireless extenders 3, and client devices 4. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 2, the client device 4 includes a user interface 40, a network interface 41, a power supply 42, a memory 44, and a controller 46.

The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4.

The network interface 41 can include, but is not limited to, various network cards, interfaces, and circuitry implemented in software and/or hardware to enable communications with the gateway device 2 and the wireless extender 3 using the communication protocols in accordance with connections 9, 10, and/or 11 (e.g., as described with reference to FIG. 1).

For example, the network interface 41 can include multiple radios (e.g., a 2.4 GHz radio, one or more 5 GHz radios, and/or a 6 GHz radio), which may also be referred to as wireless local area network (WLAN) interfaces. The radios (e.g., 2.4 GHz, 5 GHz, and/or 6 GHz radio(s)) provide a fronthaul (FH) connection between the client device(s) 4 and the gateway device 2 and/or the wireless extender 3.

The power supply 42 supplies power to the internal components of the client device 4 through the internal bus 47. The power supply 42 can be a self-contained power source such as a battery pack with an interface to be powered through an electrical charger connected to an outlet (e.g., either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (e.g., 40, 41, 42, 44, 46) of the client device 4 may be established using an internal bus 47.

The wireless extender 3 can be, for example, a hardware electronic device such as an access point (AP) used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 30, a network interface 31, a power supply 32, a memory 34, and a controller 36.

The user interface 30 can include, but is not limited to, push buttons, a keyboard, a keypad, an LCD, a TFT, an LED, an HD or other similar display device including a display device having touch screen capabilities so as to allow interaction between a user and the wireless extender 3.

The network interface 31 can include various network cards, interfaces, and circuitry implemented in software and/or hardware to enable communications with the client device 4 and the gateway device 2 using the communication protocols in accordance with connections 8, 9, and/or 11 (e.g., as described with reference to FIG. 1). For example, the network interface 31 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender 3 and the gateway device 2, and optionally other wireless extender(s) 3. Another radio or set of radios (e.g., 2.4 GHz, 5 GHz, and/or 6 GHz radio(s)) provides a fronthaul (FH) connection between the wireless extender 3 and one or more client device(s) 4.

The power supply 32 supplies power to the internal components of the wireless extender 3 through the internal bus 37. The power supply 32 can be connected to an electrical outlet (e.g., either directly or by way of another device) via a cable or wire.

The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 associated with controlling the general functions and operations of the wireless extender 3 in accordance with the embodiments described in the present disclosure.

The controller 36 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the wireless extender 3 in accordance with the embodiments described in the present disclosure. General communication between the components (e.g., 30, 31, 32, 34, 36) of the wireless extender 3 may be established using the internal bus 37.

The gateway device 2 can be, for example, a hardware electronic device that can combine the functions of a modem, an access point (AP), and/or a router for providing content received from the content provider (ISP) 1 to network devices (e.g., wireless extenders 3, client devices 4) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the gateway device 2.

The network interface 21 may include various network cards, and circuitry implemented in software and/or hardware to enable communications with the wireless extender 3 and the client device 4 using the communication protocols in accordance with connections 8, 9, 10, and/or 11 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) can provide a wireless backhaul (BH) connection between the gateway device 2 and the wireless extender(s) 3. Another radio or set of radios (e.g., 2.4 GHz, 5 GHz, and/or 6 GHz radio(s)) can provide a fronthaul (FH) connection between the gateway device 2 and one or more client device(s) 4.

The power supply 22 supplies power to the internal components of the gateway device 2 through the internal bus 27. The power supply 22 can be connected to an electrical outlet (e.g., either directly or by way of another device) via a cable or wire.

The WAN interface 23 may include various network cards, and circuitry implemented in software and/or hardware to enable communications between the gateway device 2 and the Internet 6, via the ISP 1 and the WAN adaptor 5, using the wired and/or wireless protocols in accordance with connection 7 (e.g., as described with reference to FIG. 1). For example, the WAN interface 23 can include an Ethernet port and one or more radios (e.g., a 6 GHz radio). The WAN interface 23 (e.g., 6 GHz radio) may be used to provide a wireless backhaul (BH) connection between the gateway device 2 and the WAN adaptor 5 (e.g., as described with reference to FIG. 1, and further described with reference to FIG. 3 below), according to example embodiments of the present disclosure. However, the WAN interface 23 could provide a wired Ethernet connection (e.g., a BH connection) between the gateway device 2 and the WAN adaptor 5 according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (e.g., wireless extenders 3 and client devices 4) in the network in accordance with the embodiments described in the present disclosure (e.g., including a virtual interface function according to some example embodiments of the present disclosure).

The controller 26 controls the general operations of the gateway device 2 as well as performs management functions related to the other devices (e.g., wireless extenders 3 and client device 4) in the network. The controller 26 may also be referred to as a gateway access point (AP) wireless resource controller. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the gateway device 2 in accordance with the embodiments described in the present disclosure. Communication between the components (e.g., 20, 21, 22, 23, 24, 26) of the gateway device 2 may be established using the internal bus 27. The controller 26 may also be referred to as a processor, generally.

FIG. 3 is a more detailed block diagram illustrating certain components of an exemplary gateway device and an exemplary wide area network adaptor implemented in the system of FIG. 1, according to an embodiment of the present disclosure.

As shown in FIG. 3, the gateway device 2 includes the network interface 21, the WAN interface 23, the memory 24, and the controller (processor) 26.

The network interface 21 includes an Ethernet port 203 (e.g., a wired LAN interface), a 2.4 GHz radio 204, a 5 GHz radio 205, and a 6 GHz radio 206 (e.g., wireless LAN interfaces, or WLAN interfaces). The gateway device 2 may communicate with the local area network devices (e.g., the wireless extenders 3, the client devices 4) of the system via one or more of the Ethernet port 203, the 2.4 GHz radio 204, the 5 GHz radio 205, and/or the 6 GHz radio 206. The gateway device 2 may communicate with the wide area network devices (e.g., the WAN adaptor 5) via the 6 GHz radio 206. As mentioned above, according to aspects of the present disclosure, one radio or set of radios can provide a backhaul (BH) connection between the gateway device 2, the wireless extender(s) 3 and the WAN adaptor 5, while another radio or set of radios can provide a fronthaul (FH) connection between the gateway device 2 and the client device(s) 4. However, the gateway device 2 may communicate with the LAN devices (e.g., the wireless extenders 3, the client devices 4) and/or the WAN devices (e.g., the WAN adaptor 5) via a wired Ethernet port according to some alternative example embodiments.

The memory 24 includes a virtual interface function 250 and a virtual interface table 240. The virtual interface function 250 may be implemented as part of the instructions, algorithms, or software including the software 25 described above with reference to FIG. 2. The virtual interface table 300 may be a data structure storing various pieces of data, such as service set identifiers (e.g., WAN SSID and LAN SSID) and/or virtual tags (e.g., vWAN tag and vLAN tag) for use when performing operations in accordance with embodiments described in the present disclosure (e.g., including the virtual interface function according to some example embodiments).

The controller 26 includes a processor that is configured to access the memory 24, perform the virtual interface function 250 (e.g., via execution of the software 25), and make determinations based on the information in virtual interface table 240. The controller 26 also controls communications with the network devices (e.g., the wireless extenders 3, the client devices 4, and the WAN adaptor 5) via the Ethernet port 203, the 2.4 GHz radio 204, the 5 GHz radio 205, and/or the 6 GHz radio 206 in accordance with embodiments described in the present disclosure.

As shown in FIG. 3, the WAN adaptor 5 includes the network interface 51, the WAN interface 53, the memory 54, and the controller 56.

The network interface 51 may include various network cards, and circuitry implemented in software and/or hardware to enable communications with the gateway device 2 using the communication protocols in accordance with connection 7 (e.g., as described with reference to FIG. 1). For example, the network interface 51 can include a 6 GHz radio 506. The WAN adaptor 5 may communicate with the gateway device 2 via the 6 GHz radio 506. As mentioned above, according to aspects of the present disclosure, the 6 GHz radio 506 can provide a 6 GHz wireless backhaul (BH) connection between the WAN adaptor 5 and the gateway device 2. However, the WAN adaptor 5 may communicate with the gateway device 2 via a wired Ethernet port according to some alternative example embodiments.

The WAN interface 53 may include various network cards, and circuitry implemented in software and/or hardware to enable communications between the WAN adaptor 5 and the Internet 6 via the ISP 1 using the communication protocols in accordance with connection 13 (e.g., as described with reference to FIG. 1). For example, the WAN interface 53 can include an I/O port 501, which may provide a wired connection (e.g., Ethernet, cable, fiber, or the like) between the WAN adaptor 5 and the ISP 1 (e.g., via the ONT 16 as described with reference to FIG. 1). The WAN adaptor 5 may also communicate with the file server 12 of the ISP 1 via the WAN interface 53 (e.g., the wired connection of the I/O port 501).

The memory 54 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 54 can be used to store any type of instructions, software, or algorithm for controlling the general functions and operations of the WAN adaptor 5 in accordance with the embodiments described in the present disclosure.

The controller 56 includes a processor that is configured to access the memory 54 and control the general operations of the WAN adaptor 5. The controller 56 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the WAN adaptor 5 in accordance with the embodiments described in the present disclosure. The controller 56 also controls communications with the gateway device 2 via the network interface 51 (e.g., the 6 GHz radio 506) and with the ISP 1 via the WAN interface 53 (e.g., the I/O port 501) in accordance with embodiments described in the present disclosure.

Figure 4:
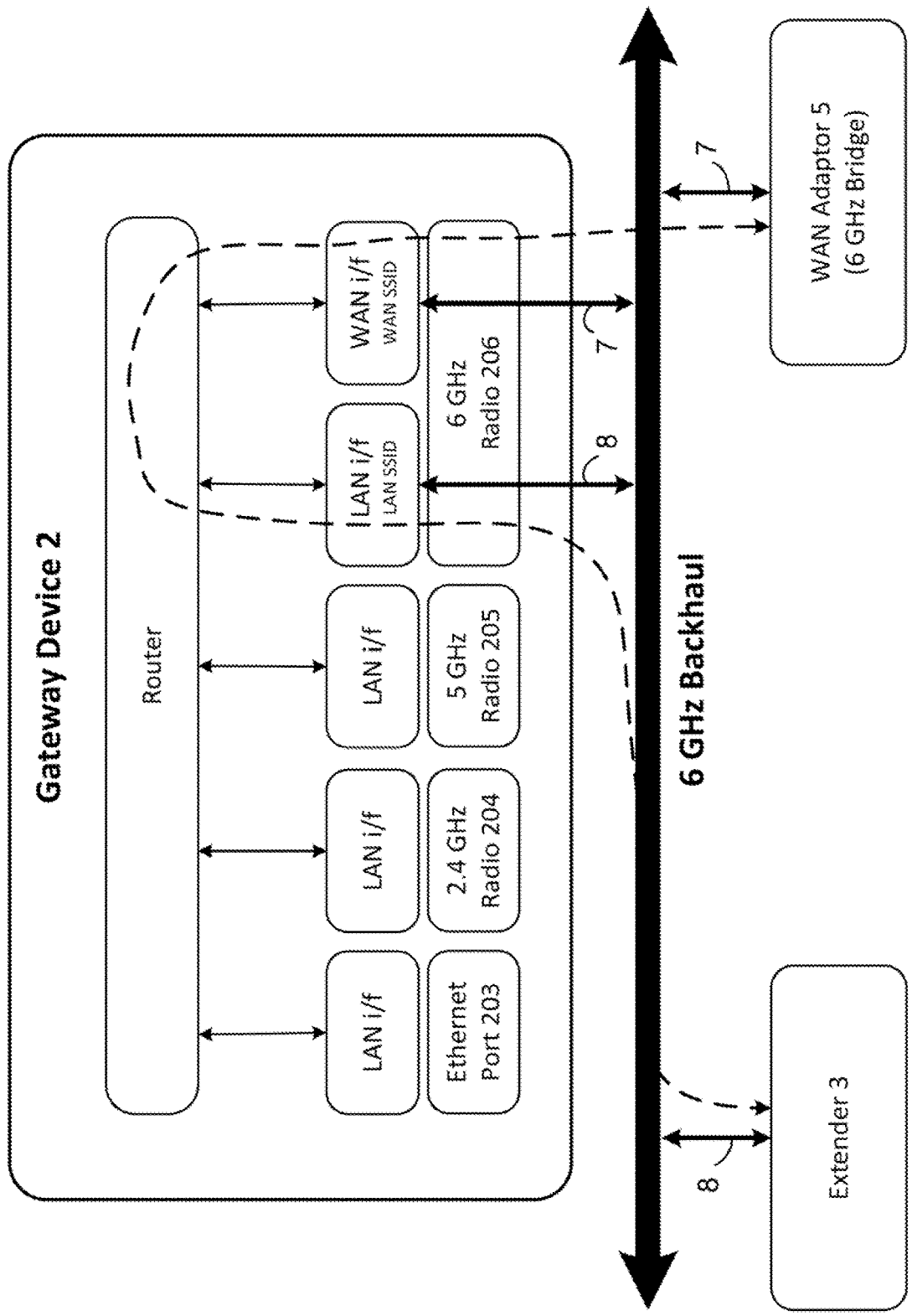
FIG. 4 is a diagram illustrating an example of a 6 GHz Backhaul connection of a gateway device with a wireless extender and a WAN adaptor, according to an example embodiment of the present disclosure.

FIG. 4 is a diagram of a 6 GHz Backhaul connection of a gateway device with a wireless extender and a WAN adaptor, according to an embodiment of the present disclosure.

Referring to FIG. 4, the 6 GHz Backhaul connection enables traffic to be communicated between a WAN (e.g., the Internet) and a LAN, or vice versa. The traffic between the WAN and the LAN goes through a router component of the gateway device 2. The gateway device 2, which may also be referred to as a residential gateway (RG), broadband access device, or access point (AP), is an electronic apparatus that may be configured for various forms of network connectivity, including but not limited to Ethernet (wired) and one or more Wi-Fi radios (wireless). For example, the gateway device 2 may include a 2.4 GHz radio, a 5 GHz radio, and a 6 GHz radio. Each of the Ethernet, 2.4 GHz radio, and 5 GHz radio may communicate with the router via a respective LAN interface. However, the 6 GHz radio may communicate with the router via either of a LAN interface and/or a WAN interface according to some example embodiments. Instead of having two separate 6 GHz radios (one for the LAN side and one for the WAN side), the solution according to example embodiments of the present disclosure involves configuring the gateway device 2 to implement two virtual interfaces (or logical interfaces) over a single physical interface, such as a 6 GHz Wi-Fi radio, during an initial setup process. The virtual LAN interface can be associated with a first SSID (LAN SSID) and the virtual WAN interface can be associated with a second SSID (WAN SSID), as will be discussed in detail below in connection with example embodiments of the present disclosure. Thus, the gateway device 2 may include a single physical interface, such as the 6 GHz radio 206, that is "virtualized" so as to provide both a LAN interface and a WAN interface.

As shown in FIG. 4, the gateway device 2 may include multiple physical interfaces, such as an Ethernet port 203, a 2.4 GHz radio 204, a 5 GHz radio 205, and a 6 GHz radio 206, for example. The gateway device 2 may also include a router component that provides a packet forward processing function for directing communications with other network devices. The Ethernet port 203 may be configured to provide a first LAN interface with the router of the gateway device 2, and may provide wired connectivity to the network devices (such as the wireless extenders 3 and/or the client devices 4). The 2.4 GHz radio 204 and the 5 GHz radio 205 may be configured to provide a second LAN interface and a third LAN interface with the router of the gateway device 2, respectively, and may provide wireless connectivity to network devices (e.g., client devices 4) that are configured to operate in the 2.4 GHz and/or 5 GHz bands. The 2.4 GHz Wi-Fi radio and the 5 GHz Wi-Fi radio may be single-band antennas in some example embodiments. However, some other example embodiments are not limited thereto, and the Wi-Fi radios may be dual-band antennas (e.g., supporting both 2.4 GHz and 5 GHz bands, at different times and/or at the same time) or tri-band antennas (e.g., supporting a single 2.4 GHz band and two 5 GHz bands, such as a low band and a high band).

According to example embodiments of the present disclosure, the 6 GHz radio 206 may be configured to provide both a fourth LAN interface and a wide area network (WAN) interface with the router of the gateway device 2, and provide wireless connectivity to network devices (e.g., wireless extenders 3 and/or client devices 4) that are configured to operate in the 6 GHz band (also referred to as 'Wi-Fi 6E' devices). The fourth LAN interface and the WAN interface may be configured as virtual interfaces provided over a single physical connection (e.g., the 6 GHz radio 206). The virtual interfaces may also be referred to as logical interfaces. A virtual LAN interface and a virtual WAN interface may be distinguished from each other by using different service set identifiers or SSIDs (e.g., 6G-LAN and 6G-WAN, Wi-Fi 6E LAN and Wi-Fi 6E WAN, NetworkName-LAN-6 GHz and NetworkName-WAN-6 GHz, etc.), according to example embodiments of the present disclosure. Each SSID is configured to connect to either the WAN side of the gateway device 2 or the LAN side of the gateway device 2. In contrast to the gateway device 2 according to example embodiments of the present disclosure, the Wi-Fi radio in currently existing RGs, GWs, and APs is always serving the LAN side only (not the WAN side). Thus, the SSID is implicitly associated with the LAN side of the known RG, GW, or AP. That is, the related art includes a LAN SSID only, whereas the gateway device 2 according to example embodiments of the present disclosure also provides a WAN SSID for the WAN side of the gateway device 2 in order to enable certain aspects of inventive concepts disclosed herein. Additionally or alternatively, LAN side traffic and WAN side traffic associated with a respective virtual interface may be distinguished from each other using a virtual tagging technique, similar to some virtual LAN (VLAN) technologies.

As shown in FIG. 4, the 6 GHz Backhaul connects the gateway device 2 with the wireless extender 3 and the WAN adaptor 5 as a result of an initial setup process. The wireless extenders 3 are Wi-Fi clients that are configured to discover and associate to the LAN SSID and acquire an IP address from the gateway device 2. The gateway device 2 can acquire the IP address for the wireless extenders 3 from the network (e.g., via a DHCP server) according to known techniques, for example. The WAN adaptor 5 is also a Wi-Fi client that is configured to discover and associate to the WAN SSID, and serve as an intermediary (e.g., a "6 GHz to Ethernet Bridge") between the LAN and the WAN. The WAN adaptor 5 may have a well-known, fixed IP address for management. Upon association with the wireless extender 3 and/or the WAN adaptor 5, a "link up" event occurs at the gateway device 2. The gateway device 2 can thus configure the wireless extenders 3 to communicate with the gateway device 2 using the LAN SSID and configure the WAN adaptor 5 to communicate with the gateway device 2 using the WAN SSID. The gateway device 2 and the WAN adaptor 5 may communicate with each other via the connection 7 (e.g., described with reference to FIG. 1), and the gateway device 2 and the wireless extenders 3 may communicate with each other via the connection 8 (e.g., described with reference to FIG. 1).

Details of a configuration phase and an input/output phase of a method for providing multiple virtual interfaces over a single physical interface may be found in co-pending U.S. Provisional Patent Application No. 63/057,004, which is incorporated herein by reference in its entirety. Such details are not discussed herein for brevity. However, it should be appreciated that configuring and applying aspects of Quality of Service (QoS) policies for the WAN side and the LAN side devices disclosed therein may be related to aspects of the optimized OFDMA subcarrier allocation for the WAN side and the LAN side devices disclosed herein.

As will be discussed in detail below in connection with FIGS. 5-8, a method, apparatus, and computer-readable medium are provided for optimized OFDMA subcarrier allocation. According to aspects of the present disclosure, the gateway device 2 can use traffic buffer status, and optionally various other scaling factors, to make the allocation determinations. The use of traffic buffer status for OFDMA subcarrier allocation is an effective means of addressing changing network traffic levels between STAs (e.g., WAN adaptor 5, wireless extenders 3, and/or client devices 4) and the RG 6 GHz AP (e.g., the gateway device 2), as well as addressing changing traffic patterns between the WAN BSTA (e.g., WAN adaptor 5) and the LAN BSTAs (e.g., the wireless extenders 3) and between intra-LAN STAs (e.g., the wireless extenders 3 and/or the client devices 4), in the example network environment shown in FIG. 1. In particular, buffer status for downlink traffic from the RG 6 GHz AP (e.g., associated to the BBSS of the gateway device 2) to the associated STAs (WAN side and LAN side) can be used to determine downlink OFDMA subcarrier allocations. Likewise, buffer status for uplink traffic from the associated STAs (WAN side and LAN side) to the RG 6 GHz AP (e.g., associated to the BBSS of the gateway device 2) can be used to determine uplink OFDMA subcarrier allocations.

General Solution (for Baseline Network or Expanded Network)

Referring again to FIG. 1, the gateway device 2 supports a backhaul with a single WAN side 6 GHz Bridge station (WAN BSTA) and a separate backhaul to each of the LAN side wireless extenders 3 (LAN BSTA 1, 2, . . . , N), using the 6 GHz radio 206. These devices will be associated on the 6 GHz Backhaul Basic Service Set (BBSS) of the gateway device 2. In a baseline 6 GHz RG network configuration, the gateway device 2 may support one or more wireless extenders 3, and each of the wireless extenders 3 may support one or more wireless client devices 4 (LAN client STA 1, 2, . . . , N). In an expanded 6 GHz RG network configuration, the gateway device 2 may also directly support one or more wireless client devices 4 associated on the Fronthaul Basic Service Set (FBSS) of the gateway device 2. In some example embodiments, the gateway device 2 may be configured to allow the client devices 4 to associate on the 6 GHz FBSS of the gateway device 2. In this case, the gateway device 2 supports the WAN adaptor 5 (WAN BSTA) and the wireless extenders 3 (LAN BSTAs 1, 2, . . . , N) on its 6 GHz BBSS and supports the client devices 4 (LAN client STAs 1, 2, . . . N) on its 6 GHz FBSS. However, in some other example embodiments, some of the wireless extenders 3 and/or the client devices 4 may be restricted to association on the 5 GHz FBSS or 2.4 GHz FBSS of the gateway device 2, such as may be the case with legacy devices that are not equipped with 6 GHz radios and IEEE 802.11ax (Wi-Fi 6) functionality. In yet some other example embodiments, the gateway device 2 may further support one or more wireless extenders 3 and/or one or more client devices 4 that are connected to the gateway device 2 via a wired connection, such as Ethernet, for example.

Figure 5:
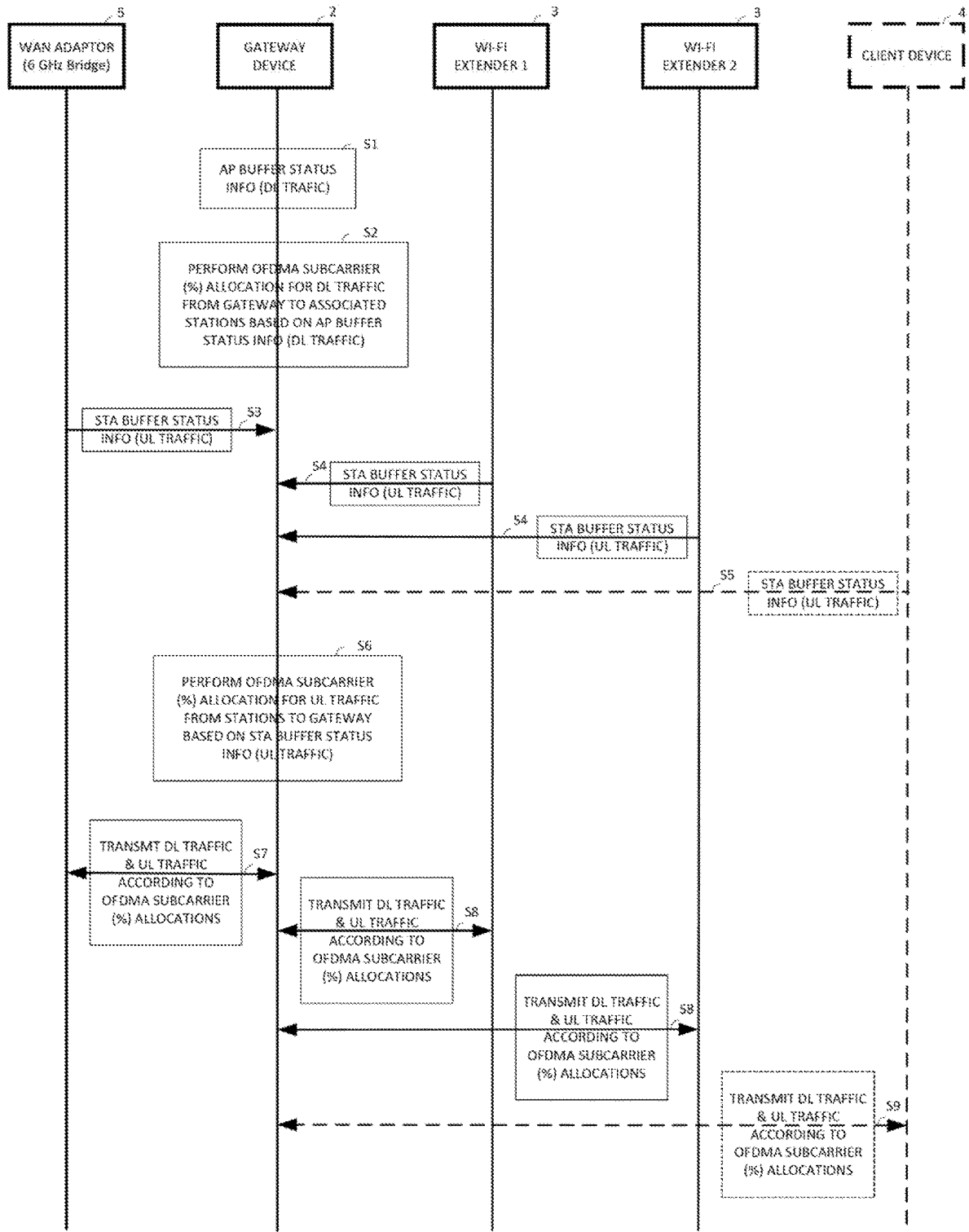
FIG. 5 is a diagram illustrating a flow of a method for optimized OFDMA subcarrier allocation according to an example embodiment of the present disclosure.

FIG. 5 is a diagram illustrating a flow of a method for optimized OFDMA subcarrier allocation according to an example embodiment of the present disclosure.

Aspects of the present disclosure focus on the OFDMA subcarrier allocation needs for the exemplary baseline 6 GHz RG network configuration (Baseline Network) of FIG. 1 discussed above. As shown in FIG. 5, the method for optimized OFDMA subcarrier allocation may involve various communications between the gateway device 2, the WAN adaptor 5 (also referred to herein as WAN BSTA), and one or more wireless extenders 3 (also referred to herein as LAN BSTAs 1, 2, . . . , N), according to some example embodiments (e.g., the baseline network configuration of FIG. 1).

However, it will also be appreciated that the exemplary expanded 6 GHz network configuration (Expanded Network) of FIG. 1 discussed above can also be accommodated if needed. As indicated by the dashed lines in FIG. 5, the method may (optionally) also involve various communications between the gateway device 2 and one or more client devices 4 (also referred to herein as LAN client STAs), according to some other example embodiments (e.g., the expanded network configuration of FIG. 1). For example, the gateway device 2 may also consider the downlink buffer status and the uplink buffer status (and optionally various other scaling factors as well) associated with client devices 4 that are configured to establish a 6 GHz fronthaul connection with the gateway device 2 using their 6 GHz radios and supporting IEEE 802.11ax functionality (e.g., Wi-Fi 6E devices). However, in the case of legacy client devices 4 (e.g., those having only 5 GHz and/or 2.4 GHz radios and supporting the previous IEEE 802.11 standards (Wi-Fi 5 and Wi-Fi 4 devices)), the gateway device 2 would not consider the legacy client devices in the OFDMA subcarrier allocation. Furthermore, the solutions of the present disclosure may be extended to 802.11ax in general (e.g., networks of devices having various combinations of 2.4 GHz, 5 GHz, and/or 6 GHz operation), as appropriate for a given network implementation.

The IEEE 802.11 standard requires AP buffer status information to include a total downlink buffered traffic load (rounded up by byte count) at an AP targeted for a given STA. The AP buffer status information also contains the access category (AC) of the highest priority traffic remaining that is buffered at the AP (highest priority buffered AC subfield) for that STA. This status is defined in Section 9.2.4.5.8 AP PS Buffer State subfield of the 2016 IEEE 802.11 standard.

Thus, referring again to FIG. 5, the gateway device 2 may determine AP buffer status information for downlink traffic that is queued at the gateway device 2 for transmission to the plurality of stations, at step S1. The gateway device 2 may then perform OFDMA subcarrier allocation for the downlink traffic from the gateway device 2 to the plurality of stations, at step S2. The optional usage of the AC information in a modification of the General Solution of FIG. 5 will be discussed below with reference to Solution Option 2 of FIG. 7 as well as Solution Option 4 discussed below.

The IEEE 802.11 standard additionally requires a Buffer Status Report (BSR) from STAs to their AP that conveys the total uplink buffered traffic load (rounded up byte count) at the STA targeted for the AP. The BSR also contains the AC of the highest priority traffic remaining that is buffered at the STA for the AP with an ACI high subfield, and the amount of buffered traffic for the ACI high indication (rounded up byte count) for that STA. This status is defined in Section 9.2.4.6a.4 BSR Control of the IEEE 802.11ax D4 standard. It should be noted that BSR information is requested from STAs by APs in an 802.11ax Trigger frame.

Thus, referring again to FIG. 5, the gateway device 2 may additionally receive STA buffer status information for uplink traffic that is queued at the STAs for transmission to the gateway device 2, from the WAN adaptor 5 at step S3 and from the wireless extenders 3, at step S4. In an optional step S5 (e.g., in the case of the expanded network of FIG. 1), the gateway device may also receive STA buffer status information from the client device 4 for uplink traffic that is queued at the client device 4 for transmission to the gateway device 2. The gateway device 2 may then perform OFDMA subcarrier allocation for the uplink traffic from the STAs to the gateway device 2, at step S6. The optional usage of the AC information in a modification of the General Solution of FIG. 5 will be discussed below with reference to Solution Option 2 of FIG. 7 as well as Solution Option 4 discussed below.

Finally, the gateway device 2 exchanges the downlink traffic and the uplink traffic with the WAN adaptor 5 according to the OFDMA subcarrier allocations at step S7 and with the wireless extenders 3 according to the OFDMA subcarrier allocations at step S8. In an optional step S9 (e.g., in the case of the expanded network of FIG. 1), the gateway device also exchanges the downlink traffic and the uplink traffic with the client device 4 according to the respective OFDMA subcarrier allocations.

It should be appreciated that the specific frequency of buffer status collection (downlink or uplink) for accompanying OFDMA subcarrier allocation is beyond the scope of the present disclosure. For example, the buffer status may be collected periodically based on a fixed or adjustable timer, may be collected dynamically on-demand as needed, may be requested or transmitted in response to detecting changing network conditions or traffic loads, the addition or removal of devices to/from the network, etc. The update time period may be longer for the WAN BSTA (WAN adaptor 5) and LAN STAs (wireless extenders 3), which have a more steady link quality due to remaining stationary with respect to the AP after installation. On the other hand, the update time period may be shorter for LAN client STAs (client devices 4), which have greater variability in link quality due to moving closer to or farther away from the AP over time as the user changes locations within the network environment. Nonetheless, for the purposes of implementing example embodiments disclosed herein, it is assumed that buffer status collection is conducted quickly and often enough to allow OFDMA subcarrier allocation determinations to be adequately responsive to the network traffic changes. In any case, the chosen OFDMA subcarrier allocation may be fixed until the next adjustment (e.g., updated frequency-domain OFDMA subcarrier allocation scheduling).

Figure 6:
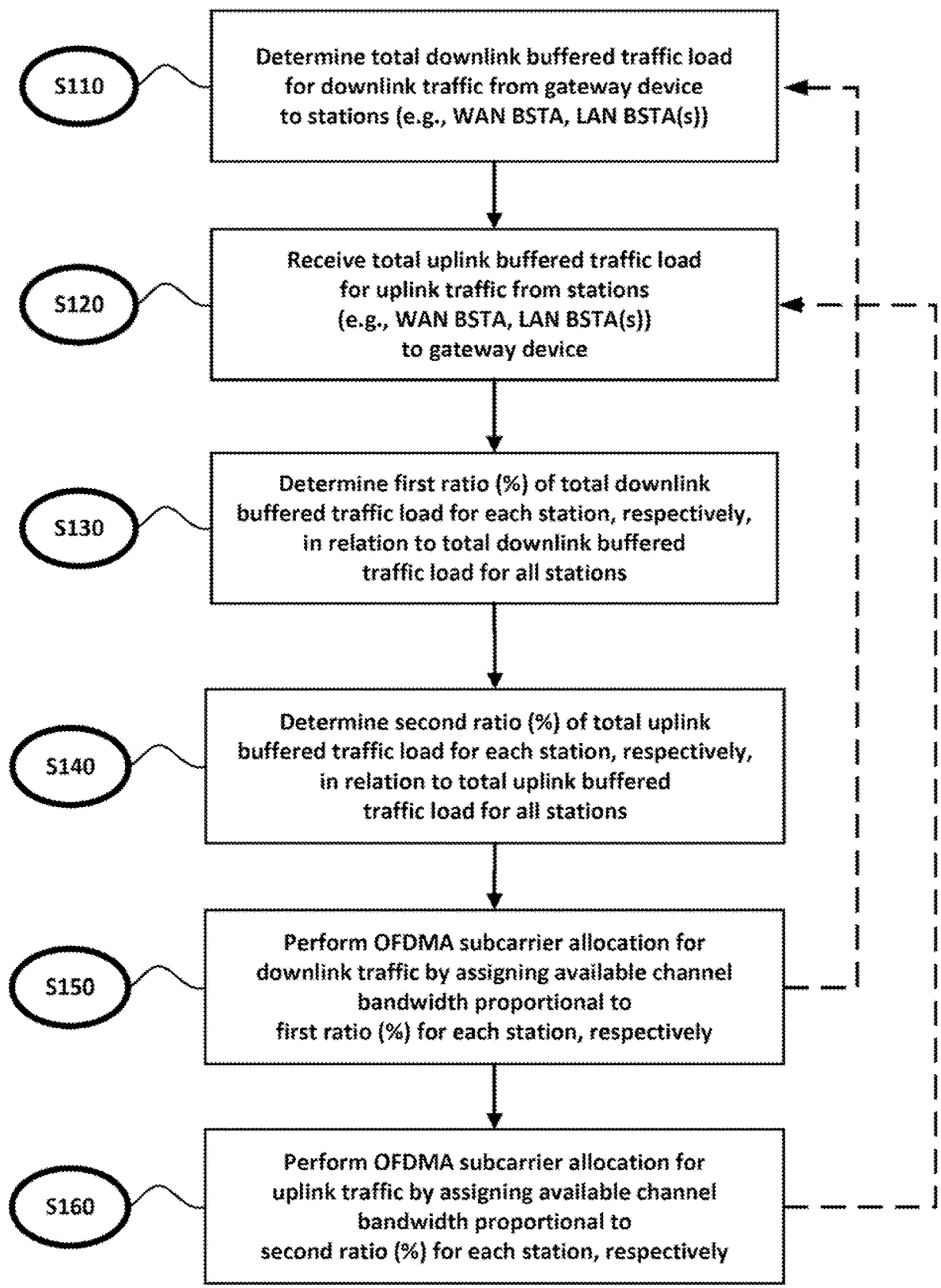
FIG. 6 is a flow chart illustrating a method for optimized OFDMA subcarrier allocation according to an example embodiment of the present disclosure.
Figure 7:
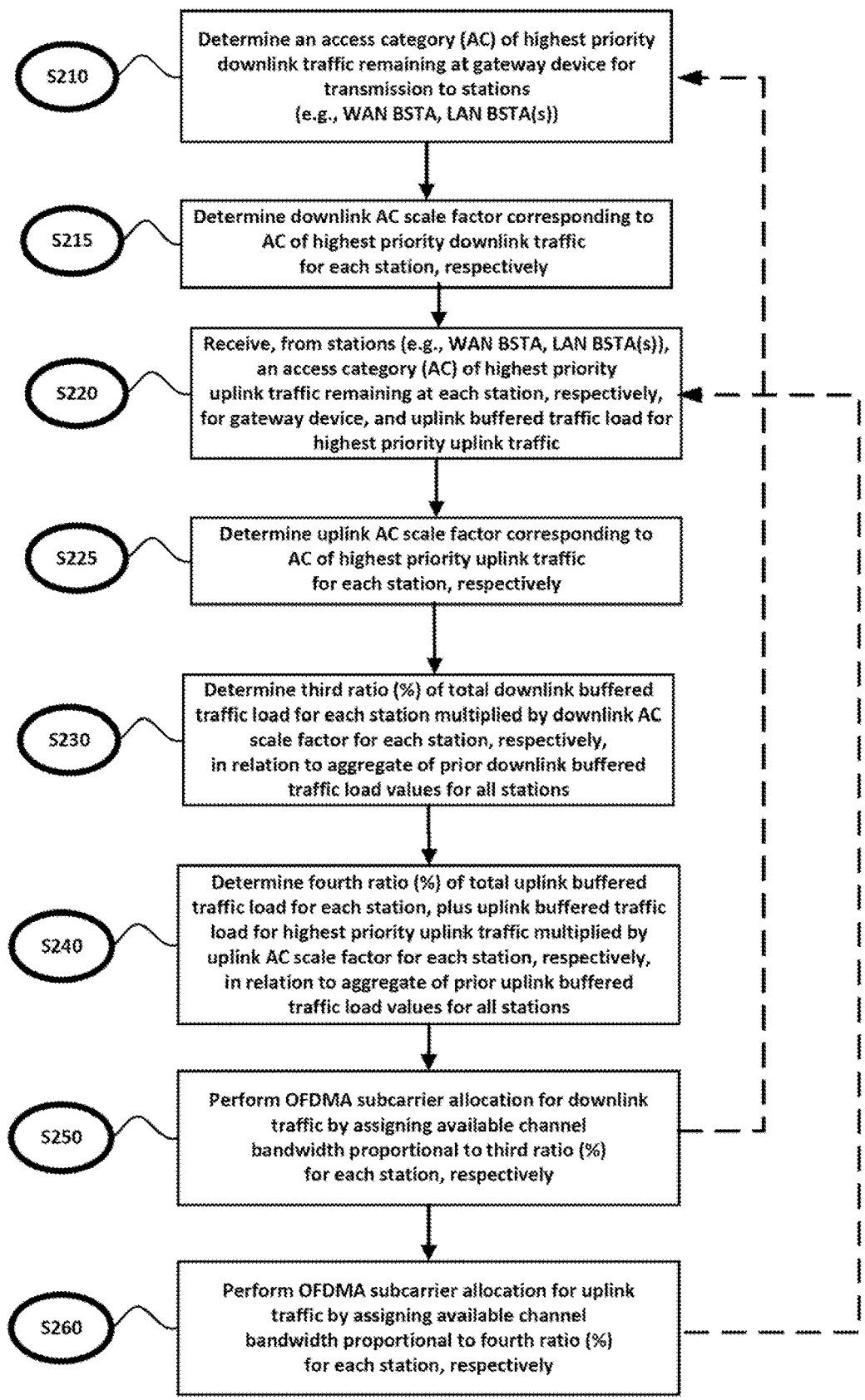
FIG. 7 is a flow chart illustrating a method for optimized OFDMA subcarrier allocation according to an example embodiment of the present disclosure.
Figure 8:
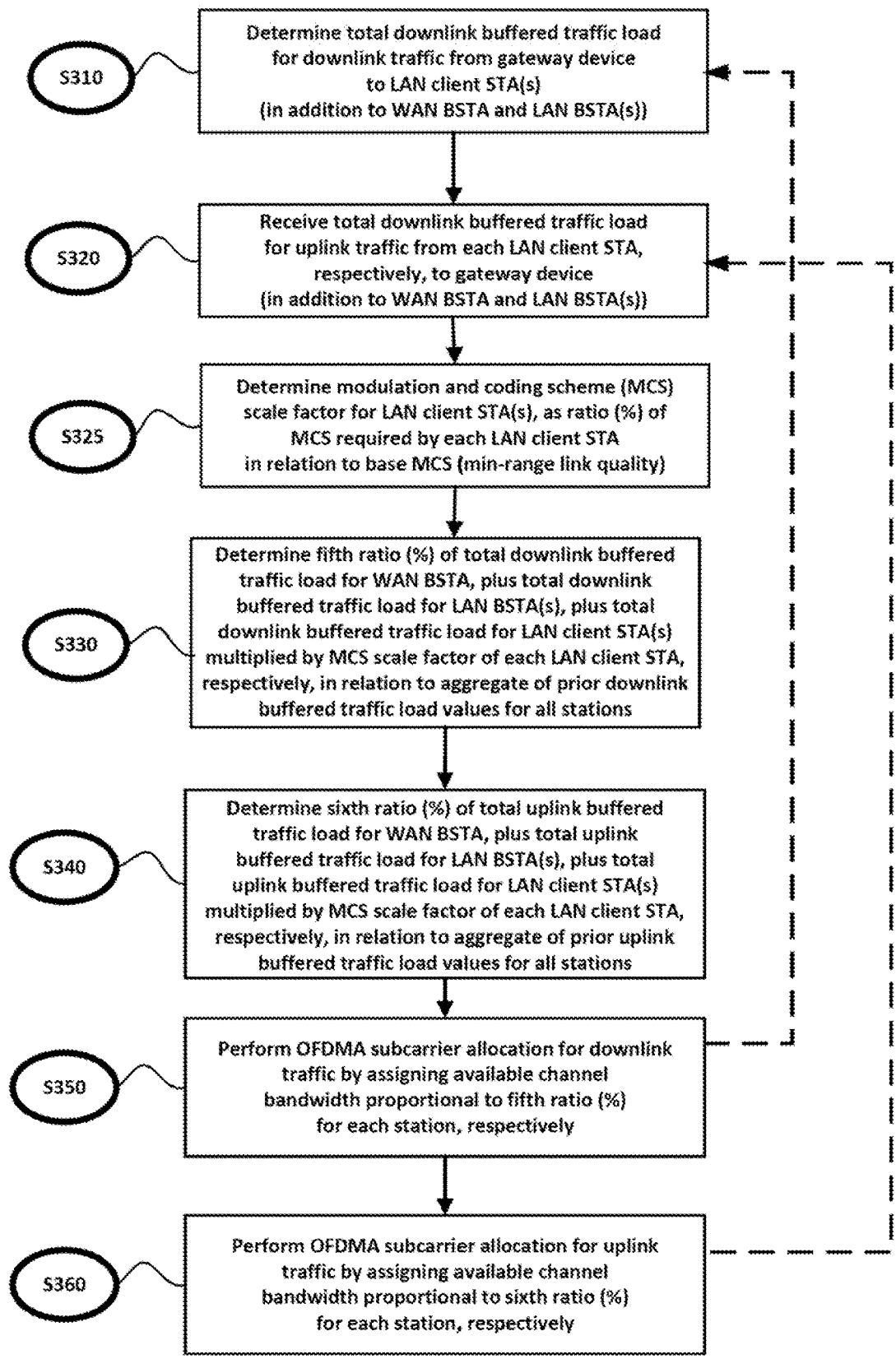
FIG. 8 is a flow chart illustrating a method for optimized OFDMA subcarrier allocation according to an example embodiment of the present disclosure.

Referring to FIGS. 6-8 below, an electronic apparatus that implements a method for optimized subcarrier allocation may be the gateway device 2, according to some example embodiments of the present disclosure. However, the method may be similarly implemented by a wireless extender 3, or an access point (AP) generally in some other example embodiments. The electronic apparatus may be in communication with a plurality of stations (STAs). In some example embodiments (e.g., the baseline network), the plurality of STAs includes a WAN backhaul station (WAN BSTA) such as the WAN adaptor 5 and one or more LAN backhaul stations (LAN BSTA(s)) such as the wireless extenders 3. In some other example embodiments (e.g., the expanded network), the plurality of STAs in communication with the electronic apparatus further includes one or more LAN side wireless client stations (LAN client STA(s)) such as the client devices 4.

Solution Option 1 for Baseline Network

FIG. 6 is a flow chart illustrating a method for optimized OFDMA subcarrier allocation according to an embodiment of the present disclosure.

According to Solution Option 1 of FIG. 6, the gateway device 2 uses the ratio of total buffer status discussed above to determine the OFDMA subcarrier allocation for the stations.

As shown in FIG. 6, a method for optimized OFDMA subcarrier allocation may include determining a total downlink buffered traffic load for downlink traffic to be transmitted from the gateway device 2 to each of the stations (e.g., the WAN BSTA such as a WAN adaptor 5, and one or more LAN BSTA(s) such as wireless extender(s) 3), respectively, at step S110. The method also includes receiving a total uplink buffered traffic load for uplink traffic to be transmitted from each of the stations (e.g., the WAN BSTA such as the WAN adaptor 5, and the one or more LAN BSTA(s) such as the wireless extender(s) 3), respectively, to the gateway device 2, at step S120.

Then, the method includes determining a first ratio (or percentage) of total downlink buffered traffic load for each station, respectively, in relation to total downlink buffered traffic load for all of the stations in the wireless network, at step S130. In the case of AP downlink traffic (from AP to associated STA), the available channel bandwidth can have OFDMA subcarrier allocation assigned proportional to the ratio (R) of total traffic queued at the AP for each STA, according to the following set of equations, for example:

$$R_{WAN_{BSTA_{DLTOT}}} = \frac{Q_{WAN_{BSTA_{DLTOT}}}}{Q_{STA_{DLTOT}}} \text{ and } R_{LAN_{BSTA(i)_{DLTOT}}} = \frac{Q_{LAN_{BSTA(i)_{DLTOT}}}}{Q_{STA_{DLTOT}}}$$

$$\text{where } Q_{STA_{DLTOT}} = Q_{WAN_{BSTA_{DLTOT}}} + \sum_{i=1}^{N} Q_{LAN_{BSTA(i)_{DLTOT}}}$$

where $$Q_{WAN_{BSTA_{DLTOT}}}$$

is the total downlink buffered traffic load for the WAN BSTA, and $$Q_{LAN_{BSTA(i)_{DLTOT}}}$$

is the total downlink buffered traffic load for the LAN BSTA(i).

Similarly, the method includes determining a second ratio (or percentage) of total uplink buffered traffic load for each station, respectively, in relation to total uplink buffered traffic load for all of the stations in the wireless network, at step S140. In the case of AP uplink traffic (from associated STA to AP), the available channel bandwidth can have OFDMA subcarrier allocation assigned proportional to the ratio (R) of total traffic queued at each STA for the AP, according to the following set of equations, for example:

$$R_{WAN_{BSTA_{ULTOT}}} = \frac{Q_{WAN_{BSTA_{ULTOT}}}}{Q_{STA_{ULTOT}}} \text{ and } R_{LAN_{BSTA(i)_{ULTOT}}} = \frac{Q_{LAN_{BSTA(i)_{ULTOT}}}}{Q_{STA_{ULTOT}}}$$

$$\text{where } Q_{STA_{ULTOT}} = Q_{WAN_{BSTA_{ULTOT}}} + \sum_{i=1}^{N} Q_{LAN_{BSTA(i)_{ULTOT}}}$$

where $$Q_{WAN_{BSTA_{ULTOT}}}$$

is the total uplink buffered traffic load for the WAN BSTA, and $$Q_{LAN_{BSTA(i)_{ULTOT}}}$$

is the total uplink buffered traffic load for the LAN BSTA(i).

Finally, the method includes performing OFDMA subcarrier allocation for the downlink traffic by assigning available channel bandwidth proportional to the first ratio (or percentage) for each station, respectively, at step S150. Similarly, the method includes performing OFDMA subcarrier allocation for the uplink traffic by assigning available channel bandwidth proportional to the second ratio (or percentage) for each station, respectively, at step S160.

Once the first and second ratios or percentages are known for the downlink traffic and the uplink traffic, these ratios can be used to pick the closest set of OFDMA subchannel allocations (also referred to as Resource Units (RUs)) for the downlink traffic and the uplink traffic, respectively, in order to meet the calculated percentage allocations. For example, Table 27-6 from IEEE 802.11ax D4 standard below shows the max number of RUs for each channel width:

TABLE 27-6

Maximum number of RUs for each channel width

| RU type | CBW20 | CBW40 | CBW80 | CBW80 + 80 and CBW160 |
|---|---|---|---|---|
| 26-tone RU | 9 | 18 | 37 | 74 |
| 52-tone RU | 4 | 8 | 16 | 32 |

TABLE 27-6-continued

Maximum number of RUs for each channel width

| RU type | CBW20 | CBW40 | CBW80 | CBW80 + 80 and CBW160 |
|---|---|---|---|---|
| 106-tone RU | 2 | 4 | 8 | 16 |
| 242-tone RU | 1 | 2 | 4 | 8 |
| 484-tone RU | NA | 1 | 2 | 4 |
| 996-tone RU | NA | NA | 1 | 2 |
| 2 × 996 tone RU | NA | NA | NA | 1 |

The above table may be stored in the memory 24 of the gateway device 2 (e.g., as the Resource Units (RUs) Table 240) and may be accessed by the OFDMA Subcarrier Allocation Function 250 when the software 25 is executed by the controller 26 (e.g., processor) of the gateway device 2, as discussed above with reference to FIG. 3, for example. In some other example embodiments, the RUs Table 240 and the OFDMA Subcarrier Allocation Function 250 may be stored and used by other networking devices in the system, such as the wireless extenders 3 or Wi-Fi APs generally.

Consequently, as a non-limiting illustrative example, if the channel bandwidth was 80 MHz and it was determined from buffer status collection that the WAN BSTA (e.g., the WAN adaptor 5) had a 0.5 ratio (or 50%) of the total AP downlink buffered traffic load and the LAN BSTAs (e.g., a first wireless extender 3 and a second wireless extender 3) each had a 0.25 ratio (or 25%) of the total AP downlink buffered traffic load, a 996-tone RU could be assigned for the WAN BSTA (WAN adaptor 5) and 484-tone RUs assigned per LAN BSTA (wireless extenders 3), based on the information stored in the RUs Table 240. This allocation would apply until the next buffer status collection period, at which time the calculation process would be repeated and the RUs would be reallocated based on the updated calculations. Similar examples may apply in the case of the uplink traffic, and it should be appreciated that many different example RU assignments are also possible in connection with the downlink traffic and the uplink traffic (e.g., depending on a number of LAN side devices such as wireless extenders 3 and client devices 4, various priorities associated with the downlink traffic and/or uplink traffic of the LAN side devices, etc.). From Section 27.3.2.2 Resource unit of IEEE 802.11ax D4 standard, guard and DC subcarriers of the standard further defines the specific overhead for the subcarriers as a function of the bandwidth options. This overhead can be further accounted for in the OFDMA subcarrier allocations.

As indicated by the dashed lines in FIG. 6, at some time after completing steps S150 and S160 (e.g., a delay, a predetermined collection period, dynamically in response to changing network conditions or the addition/removal of network devices, etc.), the gateway device 2 may loop back to steps S110 and S120, and repeat the data collection and corresponding calculations and reallocate the OFDMA subcarriers (RUs) to the STAs based on the updated results. As mentioned above, the time period is assumed to be fast enough to allow the OFDMA subcarrier allocation function to adequately respond to network traffic changes, as may be needed or desired depending on the network implementation.

Note that as part of the OFDMA subchannel assignment, the frequency positioning of the RU assignments within the available bandwidth should take into account any STA interference conditions, as determined from a STA bandwidth query report (BQR). The IEEE 802.11ax D4 standard defines bandwidth query report operation and information in Section 9.2.4.6a.6 BQR Control. This information provides a bitmap indicating which subchannels are available at the STA based on the ED-based CCA (per 20 MHz CCA sensitivity).

Although not explicitly discussed above in connection with FIG. 6, the method of Solution Option 1 could also be applied in the context of the expanded network of FIG. 1, in which one or more client devices 4 (e.g., having a 6 GHz radio and equipped with 802.11ax (Wi-Fi 6) functionality for establishing a fronthaul connection with the gateway device 2) are also included among the plurality of stations under consideration.

It should also be noted that the AC buffer status information mentioned above is not included in Solution Option 1, but is included in Solution Option 2 discussed below with reference to FIG. 7, as well as a hybrid Solution Option 4 also discussed below.

Solution Option 2 for Baseline Network

FIG. 7 is a flow chart illustrating a method for optimized OFDMA subcarrier allocation according to an embodiment of the present disclosure.

According to Solution Option 2 of FIG. 7, the gateway device 2 uses a ratio of a mix of total buffer status discussed above, as well as AC buffer status information, to determine the OFDMA subcarrier allocation for the stations.

As shown in FIG. 7, a method for optimized OFDMA subcarrier allocation may include determining an access category (AC) of a highest priority downlink traffic remaining at the gateway device 2 for transmission to each of the stations (e.g., WAN BSTA such as the WAN adaptor 5, and LAN BSTA(s) such as the wireless extender(s) 3), respectively, at step S210. The method further includes determining a downlink AC scale factor corresponding to the AC of the highest priority downlink traffic for each station, respectively, at step S215.

The method also includes receiving an access category (AC) of a highest priority uplink traffic remaining at each station, respectively, for transmission to the gateway device 2, and an uplink buffered traffic load for the highest priority uplink traffic, at step S220. The method further includes determining an uplink AC scale factor corresponding to the AC of the highest priority uplink traffic for each station, respectively, at step S225.

Then, the method includes determining a third ratio (or percentage) of total downlink buffered traffic load for each station multiplied by the downlink AC scale factor for each station, respectively, in relation to an aggregate of prior downlink buffered traffic load values for all of the stations in the wireless network, at step S230. In the case of AP downlink traffic (from AP to associated STA), the available channel bandwidth can have OFDMA subcarrier allocation assigned proportional to the ratio of total traffic queued at the AP for each STA along with a scaler multiple of available AC buffer status information, according to the following set of equations, for example:

$$R_{WAN_{BSTA_{DL}}} = \frac{Q_{WAN_{BSTA_{DL}}}}{Q_{STA_{DL}}} \text{ and } R_{LAN_{BSTA(i)_{DL}}} = \frac{Q_{LAN_{BSTA(i)_{DL}}}}{Q_{STA_{DL}}}$$

where $Q_{WAN_{BSTA_{DL}}} = Q_{WAN_{BSTA_{DLTOT}}} \cdot S_{AC}(wan\ bsta\ dl\ highest\ ac)$, and $Q_{LAN_{BSTA(i)_{DL}}} = Q_{LAN_{BSTA(i)_{DLTOT}}} \cdot S_{AC}(lan\ bsta(i)\ dl\ higheset\ ac)$, where $Q_{DLTOT}^{BSTA}$ is the total downlink buffered traffic load for the specified STA, where $S_{AC}(k)$ is a configurable scale factor based on the highest priority AC=k traffic in the downlink buffer, $$\text{and } Q_{STA_{DL}} = Q_{WAN_{BSTA_{DL}}} + \sum_{i=1}^{N} Q_{LAN_{BSTA(i)_{DL}}}.$$

Similarly, the method includes determining a fourth ratio (or percentage) of total uplink buffered traffic load for each station, plus the uplink buffered traffic load for the highest priority uplink traffic multiplied by the uplink AC scale factor for each station, respectively, in relation to an aggregate of prior uplink buffered traffic load values all of the stations in the wireless network, at step S240. In the case of AP uplink traffic (from associated STA to AP), the available channel bandwidth can have OFDMA subcarrier allocation assigned proportional to the ratio of total traffic queued at each STA for the AP along with a scaler multiple of available AC buffer status information, according to the following set of equations, for example:

$$R_{WAN_{BSTA_{UL}}} = \frac{Q_{WAN_{BSTA_{UL}}}}{Q_{STA_{UL}}} \text{ and } R_{LAN_{BSTA(i)_{UL}}} = \frac{Q_{LAN_{BSTA(i)_{UL}}}}{Q_{STA_{UL}}}$$

where $Q_{WAN_{BSTA_{UL}}} =$ $$Q_{WAN_{BSTA_{ULTOT}}} + Q_{WAN_{BSTA_{UL\,AC\,high}}} \cdot S_{AC}(\text{wan bsta ul highest ac}),$$

where $Q_{LAN_{BSTA(i)_{UL}}} =$ $$Q_{LAN_{BSTA(i)_{ULTOT}}} + Q_{WAN_{BSTA(i)_{UL\,AC\,high}}} \cdot S_{AC}(\text{lan bsta(i) ul highest ac}),$$

where $Q_{DLTOT}^{BSTA}$ is the total uplink buffered traffic load for the specified STA, where $S_{AC}(k)$ is a configurable scale factor based on the highest priority AC=k traffic in the uplink buffer, $$\text{and } Q_{STA_{UL}} = Q_{WAN_{BSTA_{UL}}} + \sum_{i=1}^{N} Q_{LAN_{BSTA(i)_{UL}}}.$$

Finally, the method includes performing OFDMA subcarrier allocation for the downlink traffic by assigning available channel bandwidth proportional to the third ratio (or percentage) for each station, respectively (as weighted by the downlink scale factor of each of the stations), at step S250. Similarly, the method includes performing OFDMA subcarrier allocation for the uplink traffic by assigning available channel bandwidth proportional to the fourth ratio (or percentage) for each station, respectively (as weighted by the uplink scale factor of each of the stations), at step S260.

Once the third and fourth ratios or percentages are known for the downlink traffic and the uplink traffic, they can be used to pick the closest set of OFDMA subchannel allocations (or RUs) for the downlink traffic and the uplink traffic, respectively, in order to meet the percentage allocations, in a similar manner as discussed above in connection with Solution Option 1 of FIG. 6 (e.g., using Table 27-6 from IEEE 802.11ax D4 standard shown above).

As indicated by the dashed lines in FIG. 7, at some time after completing steps S250 and S260 (e.g., a delay, a predetermined collection period, dynamically in response to changing network conditions or the addition/removal of network devices, etc.), the gateway device 2 may loop back to steps S210 and S220, and repeat the data collection and corresponding calculations and reallocate the OFDMA subcarriers (RUs) to the STAs based on the updated results. As mentioned above, the time period is assumed to be fast enough to allow the OFDMA subcarrier allocation function to adequately respond to network traffic changes, as may be needed or desired depending on the network implementation.

Although not explicitly discussed above in connection with FIG. 7, the method of Solution Option 2 could also be applied in the context of the expanded network of FIG. 1, in which one or more client devices 4 (e.g., having a 6 GHz radio and equipped with 802.11ax (Wi-Fi 6) functionality for establishing a fronthaul connection with the gateway device 2) are also included among the plurality of stations under consideration.

In addition to the above considerations, there may also be special considerations that apply when one or more LAN client STA(s) (e.g., mobile wireless client devices 4) are also being considered in the optimized OFDMA subcarrier allocation, in addition to the WAN BSTA (e.g., WAN adaptor 5) and the one or more LAN BSTA(s) (e.g., the wireless extenders 3), as will be discussed below with reference to FIG. 8.

Solution Option 3 for Expanded Network

FIG. 8 is a flow chart illustrating a method for optimized OFDMA subcarrier allocation according to an embodiment of the present disclosure.

It is assumed that the WAN BSTA (e.g., WAN adaptor 5) and the LAN BSTAs (e.g., the wireless extenders 3) are generally positioned for good backhaul link quality, and are generally not moved again after initial setup of the network. By contrast, LAN client STAs (e.g., the client devices 4) generally have large variability in link quality over time, due to the fact that they are mobile devices and typically do not always remain in the same fixed location. Consequently, if the LAN client STAs (e.g. the client devices 4) are also included in the OFDMA subcarrier allocation (such as for the Expanded 6 GHz RG network configuration discussed above), then modulation coding scheme (MCS) information of the LAN client STAs should also be considered in the OFDMA subcarrier allocation, along with the buffer status information. For example, considering the MCS information may serve to avoid giving too much airtime to a LAN client STA which requires low MCS (poor link quality), such as when a client device 4 moves farther away from the AP (e.g., the gateway device 2).

According to Solution Option 3, the gateway device 2 uses the MCS information of the LAN client STA(s) (e.g., the client devices 4), in addition to the buffer status information, to determine the OFDMA subcarrier allocation for the stations. The following is a possible approach for downlink and uplink OFDMA subcarrier allocation, which builds off Solution Option 1 discussed above with reference to FIG. 6 by adding client STA buffer size total and scaling their buffer size by their required MCS relative to a configurable base MCS, wherein the base MCS is considered representative of good min-range link quality (which may be an intermediate value of 4 or 5, for example).

As shown in FIG. 8, a method for optimized OFDMA subcarrier allocation may include determining a total downlink buffered traffic load for downlink traffic to be transmitted from the gateway device 2 to each of the LAN client STA(s) (e.g., the client device(s) 4), respectively, at step S310. In Solution Option 3 of FIG. 8, step S310 may be performed in addition to step S110 discussed above with reference to Solution Option 1 of FIG. 6, for example. The method also includes receiving a total uplink buffered traffic load for uplink traffic to be transmitted from each of the LAN client STA(s) (e.g., the client device(s) 4), respectively, to the gateway device 2, at step S320. In Solution Option 3 of FIG. 8, step S320 may be performed in addition to step S120 discussed above with reference to Solution Option 1 of FIG. 6, for example.

The method further includes determining a modulation and coding scheme (MCS) scale factor for each of the LAN client STA(s), as a ratio (or percentage) of the MCS required by each of the LAN client STA(s) in relation to a base MCS (e.g., representing the min-range link quality), respectively, at step S325.

Then, the method includes determining a fifth ratio (or percentage) of the total downlink buffered traffic load for the WAN BSTA, plus the total downlink buffered traffic load for the LAN BSTA(s), plus the total downlink buffered traffic load for the LAN client STA(s) multiplied by the MCS scale factor of each LAN client STA, respectively, in relation to an aggregate of prior downlink buffered traffic load values for all of the stations in the wireless network, at step S330. In the case of AP downlink traffic (from AP to associated STA), the available channel bandwidth can have OFDMA subcarrier allocation assigned according to the following set of equations:

$$R_{WAN_{BSTA_{DLTOT}}} = \frac{Q_{WAN_{BSTA_{DLTOT}}}}{Q_{STA_{DLTOT}}} \text{ and } R_{LAN_{BSTA(i)_{DLTOT}}} =$$

$$\frac{Q_{LAN_{BSTA(i)_{DLTOT}}}}{Q_{STA_{DLTOT}}} \text{ and } R_{LAN_{CLIENT\ STA_{DLTOT}}} = \frac{Q_{LAN_{CLIENT\ STA_{DLTOT}}}}{Q_{STA_{DLTOT}}}$$

where $Q_{STA_{DLTOT}} = Q_{WAN_{BSTA_{DLTOT}}} + \sum_{i=1}^{N} Q_{LAN_{BSTA(i)_{DLTOT}}} +$ $$\sum_{i=1}^{N} Q_{LAN_{CLIENT\ STA(i)_{DLTOT}}} \cdot S_{MCS}(\text{client } sta(i)\ mcs),$$

and $S_{MCS}(i) =$ $$\frac{\text{MIN}(LAN\ \text{CLIENT}(i)\ MCS,\ \text{CONFIGURABLE BASE}\ MCS)}{\text{CONFIGURABLE BASE}\ MCS}.$$

Similarly, the method includes determining a sixth ratio (or percentage) of the total uplink buffered traffic load for the WAN BSTA, plus the total uplink buffered traffic load for the LAN BSTA(s), plus the total uplink buffered traffic load for the LAN client STA(s) multiplied by the MCS scale factor of each LAN client STA, respectively, in relation to an aggregate of prior uplink buffered traffic load values for all of the stations in the wireless network, at step S340. In the case of AP uplink traffic (from associated STA to AP), the available channel bandwidth can have OFDMA subcarrier allocation assigned according to the following set of equations:

$$R_{WAN_{BSTA_{ULTOT}}} = \frac{Q_{WAN_{BSTA_{ULTOT}}}}{Q_{STA_{ULTOT}}} \text{ and } R_{LAN_{BSTA(i)_{ULTOT}}} =$$

$$\frac{Q_{LAN_{BSTA(i)_{ULTOT}}}}{Q_{STA_{ULTOT}}} \text{ and } R_{LAN_{CLIENT\ STA_{ULTOT}}} = \frac{Q_{LAN_{CLIENT\ STA_{ULTOT}}}}{Q_{STA_{ULTOT}}}$$

where $Q_{STA_{ULTOT}} = Q_{WAN_{BSTA_{ULTOT}}} + \sum_{i=1}^{N} Q_{LAN_{BSTA(i)_{ULTOT}}} +$ $$\sum_{i=1}^{N} Q_{LAN_{CLIENT\ STA(i)_{ULTOT}}} \cdot S_{MCS}(\text{client } sta(i)\ mcs)$$

and $S_{MCS}(i) =$ $$\frac{\text{MIN}(LAN\ \text{CLIENT}(i)MCS,\ \text{CONFIGURABLE BASE}\ MCS)}{\text{CONFIGURABLE BASE}\ MCS}$$

Finally, the method includes performing OFDMA subcarrier allocation for the downlink traffic by assigning available channel bandwidth proportional to the fifth ratio (or percentage) for each station, respectively (as weighted by the MCS scale factor for each LAN client STA), at step S350. Similarly, the method includes performing OFDMA subcarrier allocation for the uplink traffic by assigning available channel bandwidth proportional to the sixth ratio (or percentage) for each station, respectively (as weighted by the MCS scale factor for each LAN client STA), at step S360.

Once the fifth and sixth ratios or percentages are known for the downlink traffic and the uplink traffic, they can be used to pick the closest set of OFDMA subchannel allocations (or RUs) for the downlink traffic and the uplink traffic, respectively, in order to meet the percentage allocations, in a similar manner as discussed above in connection with Solution Option 1 of FIG. 6 (e.g., using Table 27-6 from IEEE 802.11ax D4 standard shown above).

As indicated by the dashed lines in FIG. 8, at some time after completing steps S350 and S360 (e.g., a delay, a predetermined collection period, dynamically in response to changing network conditions or the addition/removal of network devices, etc.), the gateway device 2 may loop back to steps S310 and S320, and repeat the data collection and corresponding calculations and reallocate the OFDMA subcarriers (RUs) to the STAs based on the updated results. As mentioned above, the time period is assumed to be fast enough to allow the OFDMA subcarrier allocation function to adequately respond to network traffic changes, as may be needed or desired depending on the network implementation. For example, the time period may be relatively shorter for the LAN client STAs (e.g., the mobile client devices 4), and relatively longer for the WAN BSTA and the LAN BSTA(s) (e.g., the WAN adaptor 5 and the wireless extenders 3, which typically remain stationary after installation in many cases).

In some additional example embodiments, a combination of the techniques discussed above in connection with Solution Option 1 of FIG. 6 (buffer status), Solution Option 2 of FIG. 7 (AC scale factor), and Solution Option 3 of FIG. 8 (MCS scale factor) may be used, as will be discussed below.

Solution Option 4 for Expanded Network

In some example embodiments, the one or more LAN client STAs (e.g., the client devices 4) could also have the MCS scaling approach to OFDMA subcarrier allocation discussed above with reference to FIG. 8 and Solution Option 3 also applied to the more extensive OFDMA subcarrier allocation approach that accounts for AC buffer status information discussed above with reference to FIG. 7 and Solution Option 2.

According to Solution Option 4, the gateway device 2 uses a ratio of a mix of total buffer status discussed above as well as AC buffer status information and client MCS information to determine the OFDMA subcarrier allocation for the stations.

This combined approach involves an extensive set of equations which build off those from Solution Option 2 of FIG. 7 by adding LAN client STA information with MCS scale factor from Solution Option 3 of FIG. 8. Equipped with the sets of equations and techniques disclosed above in connection with Solution Option 2 of FIG. 7 and Solution Option 3 of FIG. 8, a person of skill in the art would be able to devise a suitable set of modified equations that accounts for not only the buffer status information of the plurality of STAs, but also the AC information of the plurality of STAs and the MCS information of the LAN client STAs, specifically.

Other Considerations

It should be noted that various other factors, such as target RSSI and MCS configuration that are used in triggered responses scheduling (TRS) information for uplink client transmission control, are outside the scope of the present disclosure and are not addressed herein. However, when accounted for there would be the added need to determine a set of stations that can produce similar RSSI at the AP (e.g., the gateway device 2) to be part of simultaneous uplink transmissions to the AP (with their own sub-carrier allocations). If client stations are stationary, this functionality can be more easily implemented by a controller. On the other hand, this operation should be done in real time (or in near real-time) for client stations that are mobile and may change locations frequently.

It should also be appreciated that there are many other possible solutions for the cases of the baseline network and the expanded network discussed above. A key aspect of all of the example solutions discussed above with reference to FIGS. 5-8 is having a certain degree of flexibility in the solution options, including the frequency of measurements and configurability of the scale factors (e.g., the AC scale factor of Solution Option 2 of FIG. 7 and Solution Option 4, and/or the MCS scale factor of Solution Option 3 of FIG. 8 and Solution Option 4).

In addition, it is recognized that there may be some cases where not all client stations can be supported for a given uplink or downlink transmission, even when assigned the lowest MCS for the AP. For IEEE 802.11ax uplink transmissions in particular, an AP must receive signals from different STAs at similar power levels. To support this, 802.11ax defines a power pre-correction mechanism where the AP indicates in Trigger frame its current transmit power and the target signal strength that the AP is expected to receive from a STA in a following uplink transmission. Using the AP's transmit power and the signal strength of a received Trigger frame, a STA can then estimate the path loss to the AP and calculate an appropriate transmit power for the following uplink transmission. Since the AP selects the MCS for the uplink transmissions, each STA also includes information about its uplink power headroom (i.e., the difference between its maximum power and its current transmit power for the assigned MCS). This is defined in Section 9.2.4.6a.5 UPH Control of IEEE 802.11ax D4 standard. Although this is not explicitly addressed herein, such cases are not excluded from the approaches discussed above with reference to FIGS. 5-8 and this could also be factored into any OFDMA subcarrier allocation (e.g., by appropriate modification of example embodiments disclosed above by a person of skill in the art).

As discussed above, the method for optimized OFDMA subcarrier allocation can be used to ensure that devices in the network receive a needed or desired level of QoS, by allocating bandwidth based on loading conditions (e.g., the buffer status information) and optionally based on various other scaling factors as well (e.g., relating to the AC information and/or the MCS information). The techniques discussed above can ensure efficient and proportional allocation of bandwidth to different devices in the network. In addition, the bandwidth may be periodically and/or dynamically re-allocated based on timers, changing network traffic conditions, addition/removal of wireless extenders and/or client devices, or the like.

Although the methods of FIGS. 5-8 are discussed in connection with the gateway device 2 according to some example embodiments, the methods could similarly be performed by a wireless extender 3, a Wi-Fi access point (AP) generally, and/or other similar Wi-Fi networking devices according to some other example embodiments. The gateway device 2 may be programmed with instructions (e.g., controller instructions) to perform the OFDMA subcarrier allocation function in some example embodiments, or may use its native software in some other example embodiments. Additionally or alternatively, some aspects of example embodiments of the present disclosure may be implemented via Wi-Fi firmware of the gateway device 2, the wireless extenders 3, a Wi-Fi AP, or the like. In some example embodiments, application programming interfaces (APIs) may be utilized to determine the ratios (or percentages) for the OFDMA subcarrier allocation function based on traffic buffer status for both downlink traffic and uplink traffic, respectively. In FIGS. 5-8, it is assumed that the devices include their respective controllers or processors and their respective software stored in their respective memories, as discussed above in connection with FIGS. 2-3, which when executed by their respective controllers or processors perform the functions and operations in accordance with the example embodiments of the present disclosure (e.g., including performing an OFDMA subcarrier allocation function).

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. An access point (AP) capable of orthogonal frequency division multiple access (OFDMA) subcarrier allocation for stations in a wireless network, the AP comprising:
   a memory storing instructions; and
   a processor configured to execute the instructions to cause the AP to:
      determine a first ratio of a total downlink buffered traffic load for each of a wide area network backhaul station (WAN BSTA) and one or more local area network (LAN) BSTAs, respectively, in relation to a total downlink buffered traffic load for all of the stations in the wireless network;
      determine a second ratio of the total uplink buffered traffic load for each of the WAN BSTA and the one or more LAN BSTAs, respectively, in relation to a total uplink buffered traffic load for all of the stations in the wireless network;
      perform OFDMA subcarrier allocation for the downlink traffic by assigning available channel bandwidth proportional to the first ratio for each of the WAN BSTA and the one or more LAN BSTAs, respectively; and
      perform OFDMA subcarrier allocation for the uplink traffic by assigning available channel bandwidth proportional to the second ratio for each of the WAN BSTA and the one or more LAN BSTAs, respectively.

2. The AP of claim 1, wherein the processor is further configured to execute the instructions to cause the AP to:
   determine a downlink access category (AC) scale factor corresponding to an AC of a highest priority downlink traffic for each of the WAN BSTA and the one or more LAN BSTAs, respectively;
   determine an uplink AC scale factor corresponding to the AC of a highest priority uplink traffic for each of the WAN BSTA and the one or more LAN BSTAs, respectively;
   determine a third ratio of the total downlink buffered traffic load for each of the WAN BSTA and the one or more LAN BSTAs multiplied by the downlink AC scale factor for the highest priority downlink traffic for each of the WAN BSTA and the one or more LAN BSTAs, respectively, in relation to an aggregate of prior downlink buffered traffic load values for all of the stations in the wireless network;
   determine a fourth ratio of the total uplink buffered traffic load for each of the WAN BSTA and the one or more LAN BSTAs, plus the uplink buffered traffic load for the highest priority uplink traffic for each of the WAN BSTA and the one or more LAN BSTAs multiplied by the uplink AC scale factor of each of the WAN BSTA and the one or more LAN BSTAs, respectively, in relation to an aggregate of prior uplink buffered traffic load values for all of the stations in the wireless network;
   perform the OFDMA subcarrier allocation for the downlink traffic by assigning available channel bandwidth proportional to the third ratio for each of the WAN BSTA and the one or more LAN BSTAs, respectively; and
   perform the OFDMA subcarrier allocation for the uplink traffic by assigning available channel bandwidth proportional to the fourth ratio for each of the WAN BSTA and the one or more LAN BSTAs, respectively.

3. The AP of claim 1, wherein the processor is further configured to execute the instructions to cause the AP to:
   determine a modulation and coding scheme (MCS) scale factor for each of one or more local area network side client stations (LAN client STAs), the MCS scale factor being a ratio of MCS that is required by each of the one or more LAN client STAs in relation to a base MCS representing a min-range link quality, respectively;
   determine a fifth ratio of the total downlink buffered traffic load for the WAN BSTA, plus the total downlink buffered traffic load of the one or more LAN BSTAs, plus a total downlink buffered traffic load of the one or more LAN client STAs multiplied by the MCS scaling factor of each of the one or more LAN client STAs, respectively, in relation to an aggregate of prior downlink buffered traffic load values for all of the stations in the wireless network;

determine a sixth ratio of the total uplink buffered traffic load for the WAN BSTA, the total uplink buffered traffic load for the one or more LAN BSTAs, and the total uplink buffered traffic load for the one or more LAN client STAs multiplied by the MCS scaling factor of each of the one or more LAN client STAs, respectively, in relation to an aggregate of prior uplink buffered traffic load values for all of the stations in the wireless network;

perform the OFDMA subcarrier allocation for the downlink traffic by assigning available channel bandwidth proportional to the fifth ratio for each of the WAN BSTA, the one or more LAN BSTAs, and the one or more LAN client STAs, respectively; and perform the OFDMA subcarrier allocation for the uplink traffic by assigning available channel bandwidth proportional to the sixth ratio for each of the WAN BSTA, the one or more LAN BSTAs, and the one or more LAN client STAs, respectively.

4. The AP of claim 1, wherein the processor is further configured to execute the instructions to cause the AP to:

determine a total downlink buffered traffic load for downlink traffic from the AP to each of one or more local area network side client stations (LAN client STAs), respectively, and an access category (AC) of a highest priority downlink traffic remaining at the AP for transmission to each of the LAN client STAs, respectively;

receive, from the one or more LAN client STAs, a total uplink buffered traffic load for uplink traffic from each of the one or more LAN client STAs, respectively, to the AP, an AC of a highest priority uplink traffic remaining at the one or more LAN client STAs, respectively, for transmission to the AP, and an uplink buffered traffic load for a highest priority uplink traffic;

determine a downlink AC scale factor corresponding to the AC of the highest priority downlink traffic for each of the WAN BSTA, the one or more LAN BSTAs, and the one or more LAN client STAs, respectively;

determine an uplink AC scale factor corresponding to the AC of the highest priority uplink traffic for each of the WAN BSTA, the one or more LAN BSTAs, and the one or more LAN client STAs, respectively;

determine a modulation and coding scheme (MCS) scale factor for each of the one or more LAN client STAs, the MCS scale factor being a ratio of MCS that is required by each of the one or more LAN client STAs in relation to a base MCS representing a min-range link quality, respectively;

perform the OFDMA subcarrier allocation for the downlink traffic based on the total downlink buffered traffic load and the downlink AC scale factor for each of the WAN BSTA, the one or more LAN BSTAs, and the one or more LAN client STAs, respectively, and further based on the MCS scale factor for each of the one or more LAN client STAs; and perform the OFDMA subcarrier allocation for the uplink traffic based on the total uplink buffered traffic load and the uplink AC scale factor for each of the WAN BSTA, the one or more LAN BSTAs, and the one or more LAN client STAs, respectively, and further based on the MCS scale factor for each of the one or more LAN client STAs.

5. The AP of claim 1, wherein the processor is configured to execute the instructions to cause the AP to perform the OFDMA subcarrier allocation for the downlink traffic and the uplink traffic by:

referring to a table stored in the memory of the AP, wherein the table indicates a maximum number of resource units (RUs) for each channel width;

selecting a closest set of RUs from the table for the downlink traffic based on the first ratio of the total downlink buffered traffic load for each of the stations, respectively; and selecting a closest set of RUs from the table for the uplink traffic based on the second ratio of the total uplink buffered traffic load for each of the stations, respectively.

6. The AP of claim 5, wherein the processor is further configured to execute the instructions to cause the AP to:

determine an updated buffer status for the downlink traffic for the stations;

receive, from the stations, an updated buffer status for the uplink traffic for the AP;

determine an updated ratio of the total downlink buffered traffic load for each of the stations;

determine an updated ratio of the total uplink buffered traffic load for each of the stations;

perform OFDMA subcarrier allocation for the downlink traffic by reallocating RUs of the available channel bandwidth based on the updated ratio of the total downlink buffered traffic load for each of the stations; and perform OFDMA subcarrier allocation for the uplink traffic by reallocating RUs of the available channel bandwidth based on the updated ratio of the total uplink buffered traffic load for each of the stations.

7. A method of orthogonal frequency division multiple access (OFDMA) subcarrier allocation for stations in a wireless network, the method comprising:

determining a first ratio of a total downlink buffered traffic load for each of a wide area network backhaul station (WAN BSTA) and one or more local area network (LAN) BSTAs, respectively, in relation to a total downlink buffered traffic load for all of the stations in the wireless network;

determining a second ratio of the total uplink buffered traffic load for each of the WAN BSTA and the one or more LAN BSTAs, respectively, in relation to a total uplink buffered traffic load for all of the stations in the wireless network;

performing OFDMA subcarrier allocation for the downlink traffic by assigning available channel bandwidth proportional to the first ratio for each of the WAN BSTA and the one or more LAN BSTAs, respectively; and performing OFDMA subcarrier allocation for the uplink traffic by assigning available channel bandwidth proportional to the second ratio for each of the WAN BSTA and the one or more LAN BSTAs, respectively.

8. The method of claim 7, further comprising:

determining a downlink access category (AC) scale factor corresponding to an AC of the highest priority downlink traffic for each of the WAN BSTA and the one or more LAN BSTAs, respectively;

determining an uplink AC scale factor corresponding to the AC of the highest priority uplink traffic for each of the WAN BSTA and the one or more LAN BSTAs, respectively;

determining a third ratio of the total downlink buffered traffic load for each of the WAN BSTA and the one or more LAN BSTAs multiplied by the downlink AC scale factor for the highest priority downlink traffic for each of the WAN BSTA and the one or more LAN BSTAs, respectively, in relation to an aggregate of prior downlink buffered traffic load values for all of the stations in the wireless network;
determining a fourth ratio of the total uplink buffered traffic load for each of the WAN BSTA and the one or more LAN BSTAs, plus the uplink buffered traffic load for the highest priority uplink traffic multiplied by the uplink AC scale factor of each of the WAN BSTA and the one or more LAN BSTAs, respectively, in relation to an aggregate of prior uplink buffered traffic load values for all of the stations in the wireless network;
performing the OFDMA subcarrier allocation for the downlink traffic by assigning available channel bandwidth proportional to the third ratio for each of the WAN BSTA and the one or more LAN BSTAs, respectively; and
performing the OFDMA subcarrier allocation for the uplink traffic by assigning available channel bandwidth proportional to the fourth ratio for each of the WAN BSTA and the one or more LAN BSTAs, respectively.

9. The method of claim 7, further comprising:
determining a modulation and coding scheme (MCS) scale factor for each of one or more local area network side client stations (LAN client STAs), the MCS scale factor being a ratio of MCS that is required by each of the one or more LAN client STAs in relation to a base MCS representing a min-range link quality, respectively;
determining a fifth ratio of the total downlink buffered traffic load for the WAN BSTA, plus the total downlink buffered traffic load of the one or more LAN BSTAs, plus a total downlink buffered traffic load of the one or more LAN client STAs multiplied by the MCS scaling factor of each of the one or more LAN client STAs, respectively, in relation to an aggregate of prior downlink buffered traffic load values for all of the stations in the wireless network;
determining a sixth ratio of the total uplink buffered traffic load for the WAN BSTA, the total uplink buffered traffic load for the one or more LAN BSTAs, and the total uplink buffered traffic load for the one or more LAN client STAs multiplied by the MCS scaling factor of each of the one or more LAN client STAs, respectively, in relation to an aggregate of prior uplink buffered traffic load values for all of the stations in the wireless network;
performing the OFDMA subcarrier allocation for the downlink traffic by assigning available channel bandwidth proportional to the fifth ratio for each of the WAN BSTA, the one or more LAN BSTAs, and the one or more LAN client STAs, respectively; and
performing the OFDMA subcarrier allocation for the uplink traffic by assigning available channel bandwidth proportional to the sixth ratio for each of the WAN BSTA, the one or more LAN BSTAs, and the one or more LAN client STAs, respectively.

10. The method of claim 7, further comprising:
determining a total downlink buffered traffic load for downlink traffic from the AP to each of one or more local area network side client stations (LAN client STAs), respectively, and an AC of a highest priority downlink traffic remaining at the AP for transmission to each of the LAN client STAs, respectively;
receiving, from the one or more LAN client STAs, a total uplink buffered traffic load for uplink traffic from each of the one or more LAN client STAs, respectively, to the AP, and an AC of a highest priority uplink traffic remaining at each of the one or more LAN client STAs, respectively, for transmission to the AP, and an uplink buffered traffic load for the highest priority uplink traffic;
determining a downlink access category (AC) scale factor corresponding to the AC of the highest priority downlink traffic for each of the WAN BSTA, the one or more LAN BSTAs, and the one or more LAN client STAs, respectively;
determining an uplink AC scale factor corresponding to the AC of the highest priority uplink traffic for each of the WAN BSTA, the one or more LAN BSTAs, and the one or more LAN client STAs, respectively;
determining a modulation and coding scheme (MCS) scale factor for each of the one or more LAN client STAs, the MCS scale factor being a ratio of MCS that is required by each of the one or more LAN client STAs in relation to a base MCS representing a min-range link quality, respectively;
performing the OFDMA subcarrier allocation for the downlink traffic based on the total downlink buffered traffic load and the downlink AC scale factor for each of the WAN BSTA, the one or more LAN BSTAs, and the one or more LAN client STAs, respectively, and further based on the MCS scale factor for each of the one or more LAN client STAs; and
performing the OFDMA subcarrier allocation for the uplink traffic based on the total uplink buffered traffic load and the uplink AC scale factor for each of the WAN BSTA, the one or more LAN BSTAs, and the one or more LAN client STAs, respectively, and further based on the MCS scale factor for each of the one or more LAN client STAs.

11. The method of claim 7, wherein performing the OFDMA subcarrier allocation for the downlink traffic and the uplink traffic includes:
referring to a table stored in the memory of the AP, wherein the table indicates a maximum number of resource units (RUs) for each channel width;
selecting a closest set of RUs from the table for the downlink traffic based on the first ratio of the total downlink buffered traffic load for each of the stations, respectively; and
selecting a closest set of RUs from the table for the uplink traffic based on the second ratio of the total uplink buffered traffic load for each of the stations, respectively.

12. The method of claim 11, further comprising:
determining an updated buffer status for the downlink traffic for the stations;
from the stations, an updated buffer status for the uplink traffic for the AP;
determining an updated ratio of the total downlink buffered traffic load for each of the stations;
determining an updated ratio of the total uplink buffered traffic load for each of the stations;
performing OFDMA subcarrier allocation for the downlink traffic by reallocating RUs of the available channel bandwidth based on the updated ratio of the total downlink buffered traffic load for each of the stations; and
performing OFDMA subcarrier allocation for the uplink traffic by reallocating RUs of the available channel bandwidth based on the updated ratio of the total uplink buffered traffic load for each of the stations.

13. The method of claim 7, further comprising:
establishing wireless backhaul connections with the WAN BSTA and the one or more LAN BSTAs among the stations in the wireless network.

14. The method of claim 7, further comprising:
establishing a wireless fronthaul connection with one or more LAN side client stations among the stations in the wireless network.

15. One or more non-transitory computer-readable media storing instructions for orthogonal frequency division multiple access (OFDMA) subcarrier allocation for stations in a wireless network, the instructions when executed by a processor of an access point (AP) causing the AP to perform operations comprising:
determining a first ratio of a total downlink buffered traffic load for each of a wide area network backhaul station (WAN BSTA) and one or more local area network (LAN) BSTAs, respectively, in relation to a total downlink buffered traffic load for all of the stations in the wireless network;
determining a second ratio of the total uplink buffered traffic load for each of the WAN BSTA and the one or more LAN BSTAs, respectively, in relation to a total uplink buffered traffic load for all of the stations in the wireless network;
performing OFDMA subcarrier allocation for the downlink traffic by assigning available channel bandwidth proportional to the first ratio for each of the WAN BSTA and the one or more LAN BSTAs, respectively; and
performing OFDMA subcarrier allocation for the uplink traffic by assigning available channel bandwidth proportional to the second ratio for each of the WAN BSTA and the one or more LAN BSTAs, respectively.

16. The one or more non-transitory computer-readable media of claim 15, wherein the instructions when executed by the processor of the AP cause the AP to perform operations further comprising:
determining a downlink access category (AC) scale factor corresponding to an AC of the highest priority downlink traffic for each of the WAN BSTA and the one or more LAN BSTAs, respectively;
determining an uplink AC scale factor corresponding to the AC of the highest priority uplink traffic for each of the WAN BSTA and the one or more LAN BSTAs, respectively;
determining a third ratio of the total downlink buffered traffic load for each of the WAN BSTA and the one or more LAN BSTAs multiplied by the downlink AC scale factor for the highest priority downlink traffic for each of the WAN BSTA and the one or more LAN BSTAs, respectively, in relation to an aggregate of prior downlink buffered traffic load values for all of the stations in the wireless network;
determining a fourth ratio of the total uplink buffered traffic load for each of the WAN BSTA and the one or more LAN BSTAs, plus the uplink buffered traffic load for the highest priority uplink traffic multiplied by the uplink AC scale factor of each of the WAN BSTA and the one or more LAN BSTAs, respectively, in relation to an aggregate of prior uplink buffered traffic load values for all of the stations in the wireless network;
performing the OFDMA subcarrier allocation for the downlink traffic by assigning available channel bandwidth proportional to the third ratio for each of the WAN BSTA and the one or more LAN BSTAs, respectively; and
performing the OFDMA subcarrier allocation for the uplink traffic by assigning available channel bandwidth proportional to the fourth ratio for each of the WAN BSTA and the one or more LAN BSTAs, respectively.

17. The one or more non-transitory computer-readable media of claim 15, wherein the instructions when executed by the processor of the AP cause the AP to perform operations further comprising:
determining a modulation and coding scheme (MCS) scale factor for each of one or more local area network side client stations (LAN client STAs), the MCS scale factor being a ratio of MCS that is required by each of the one or more LAN client STAs in relation to a base MCS representing a min-range link quality, respectively;
determining a fifth ratio of the total downlink buffered traffic load for the WAN BSTA, plus the total downlink buffered traffic load of the one or more LAN BSTAs, plus a total downlink buffered traffic load of the one or more LAN client STAs multiplied by the MCS scaling factor of each of the one or more LAN client STAs, respectively, in relation to an aggregate of prior downlink buffered traffic load values for all of the stations in the wireless network;
determining a sixth ratio of the total uplink buffered traffic load for the WAN BSTA, the total uplink buffered traffic load for the one or more LAN BSTAs, and the total uplink buffered traffic load for the one or more LAN client STAs multiplied by the MCS scaling factor of each of the one or more LAN client STAs, respectively, in relation to an aggregate of prior uplink buffered traffic load values for all of the stations in the wireless network;
performing the OFDMA subcarrier allocation for the downlink traffic by assigning available channel bandwidth proportional to the fifth ratio for each of the WAN BSTA, the one or more LAN BSTAs, and the one or more LAN client STAs, respectively; and
performing the OFDMA subcarrier allocation for the uplink traffic by assigning available channel bandwidth proportional to the sixth ratio for each of the WAN BSTA, the one or more LAN BSTAs, and the one or more LAN client STAs, respectively.

18. The one or more non-transitory computer-readable media of claim 15, wherein the instructions when executed by the processor of the AP cause the AP to perform operations further comprising:
determining a total downlink buffered traffic load for downlink traffic from the AP to each of one or more local area network side client stations (LAN client STAs), respectively, and an access category (AC) of a highest priority downlink traffic remaining at the AP for transmission to each of the LAN client STAs, respectively;
receiving, from the one or more LAN client STAs, a total uplink buffered traffic load for uplink traffic from each of the one or more LAN client STAs, respectively, to the AP, and an AC of a highest priority uplink traffic remaining at each of the one or more LAN client STAs, respectively, for transmission to the AP, and an uplink buffered traffic load for a highest priority uplink traffic;
determining a downlink AC scale factor corresponding to the AC of the highest priority downlink traffic for each of the WAN BSTA, the one or more LAN BSTAs, and the one or more LAN client STAs, respectively;
determining an uplink AC scale factor corresponding to the AC of the highest priority uplink traffic for each of the WAN BSTA, the one or more LAN BSTAs, and the one or more LAN client STAs, respectively;

determining a modulation and coding scheme (MCS) scale factor for each of the one or more LAN client STAs, the MCS scale factor being a ratio of MCS that is required by each of the one or more LAN client STAs in relation to a base MCS representing a min-range link quality, respectively;

performing the OFDMA subcarrier allocation for the downlink traffic based on the total downlink buffered traffic load and the downlink AC scale factor for each of the WAN BSTA, the one or more LAN BSTAs, and the one or more LAN client STAs, respectively, and further based on the MCS scale factor for each of the one or more LAN client STAs; and performing the OFDMA subcarrier allocation for the uplink traffic based on the total uplink buffered traffic load and the uplink AC scale factor for each of the WAN BSTA, the one or more LAN BSTAs, and the one or more LAN client STAs, respectively, and further based on the MCS scale factor for each of the one or more LAN client STAs.

19. The one or more non-transitory computer-readable media of claim 15, wherein performing the OFDMA subcarrier allocation for the downlink traffic and the uplink traffic includes:

referring to a table stored in the memory of the AP, wherein the table indicates a maximum number of resource units (RUs) for each channel width;

selecting a closest set of RUs from the table for the downlink traffic based on the first ratio of the total downlink buffered traffic load for each of the stations, respectively; and selecting a closest set of RUs from the table for the uplink traffic based on the second ratio of the total uplink buffered traffic load for each of the stations, respectively.

20. The one or more non-transitory computer-readable media of claim 19, wherein the instructions when executed by the processor of the AP cause the AP to perform operations further comprising:

determining an updated buffer status for the downlink traffic for the stations;

from the stations, an updated buffer status for the uplink traffic for the AP; and determining an updated ratio of the total downlink buffered traffic load for each of the stations;

determining an updated ratio of the total uplink buffered traffic load for each of the stations;

performing OFDMA subcarrier allocation for the downlink traffic by reallocating RUs of the available channel bandwidth based on the updated ratio of the total downlink buffered traffic load for each of the stations; and performing OFDMA subcarrier allocation for the uplink traffic by reallocating RUs of the available channel bandwidth based on the updated ratio of the total uplink buffered traffic load for each of the stations.

* * * * *